(12) United States Patent
Herron

(10) Patent No.: US 12,452,060 B1
(45) Date of Patent: Oct. 21, 2025

(54) VEHICLE DIAGNOSTIC SYSTEM AND METHOD WITH AUTOMATED CONNECTIVITY TO DIAGNOSTIC APPLICATION

(71) Applicant: Opus IVS, Inc., Dexter, MI (US)

(72) Inventor: Brian J. Herron, Dexter, MI (US)

(73) Assignee: Opus IVS, Inc., Dexter, MI (US)

( * ) Notice: Subject to any disclaimer, the term of this patent is extended or adjusted under 35 U.S.C. 154(b) by 178 days.

(21) Appl. No.: 18/497,237

(22) Filed: Oct. 30, 2023

(51) Int. Cl.
*H04L 9/32* (2006.01)
*G07C 5/00* (2006.01)
*G07C 5/08* (2006.01)

(52) U.S. Cl.
CPC .............. *H04L 9/32* (2013.01); *G07C 5/008* (2013.01); *G07C 5/0808* (2013.01); *G07C 2205/02* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 2005/0177515 A1* | 8/2005 | Kalavade | H04W 4/24 705/52 |
| 2020/0167798 A1* | 5/2020 | Lee | G06N 20/20 |
| 2022/0360608 A1* | 11/2022 | Raleigh | H04L 47/2408 |
| 2023/0139695 A1* | 5/2023 | Xu | G06F 21/31 726/7 |
| 2024/0107122 A1* | 3/2024 | Akhoury | H04N 21/4828 |

* cited by examiner

*Primary Examiner* — Paul R Fisher
(74) *Attorney, Agent, or Firm* — Gardner, Linn, Burkhart & Ondersma LLP

(57) ABSTRACT

A method of facilitating access to one or more vehicle service programs, such as diagnostic software applications, for servicing an electronic system of a vehicle with a vehicle diagnostic computer tool that is configured to interface with the electronic system of a vehicle at a repair facility includes storing in computer memory a profile file for each of one or more users, where each profile file comprises credential data for a selected user for accessing one or more vehicle service programs, providing credential manager software configured to access user profile files to obtain credential data, using the credential manager software to selectively obtain credential data of a selected user for a selected vehicle service program, and supplying the credential data for the selected user with the credential manager software to the selected vehicle service program to access the selected vehicle service program for servicing the vehicle.

20 Claims, 16 Drawing Sheets

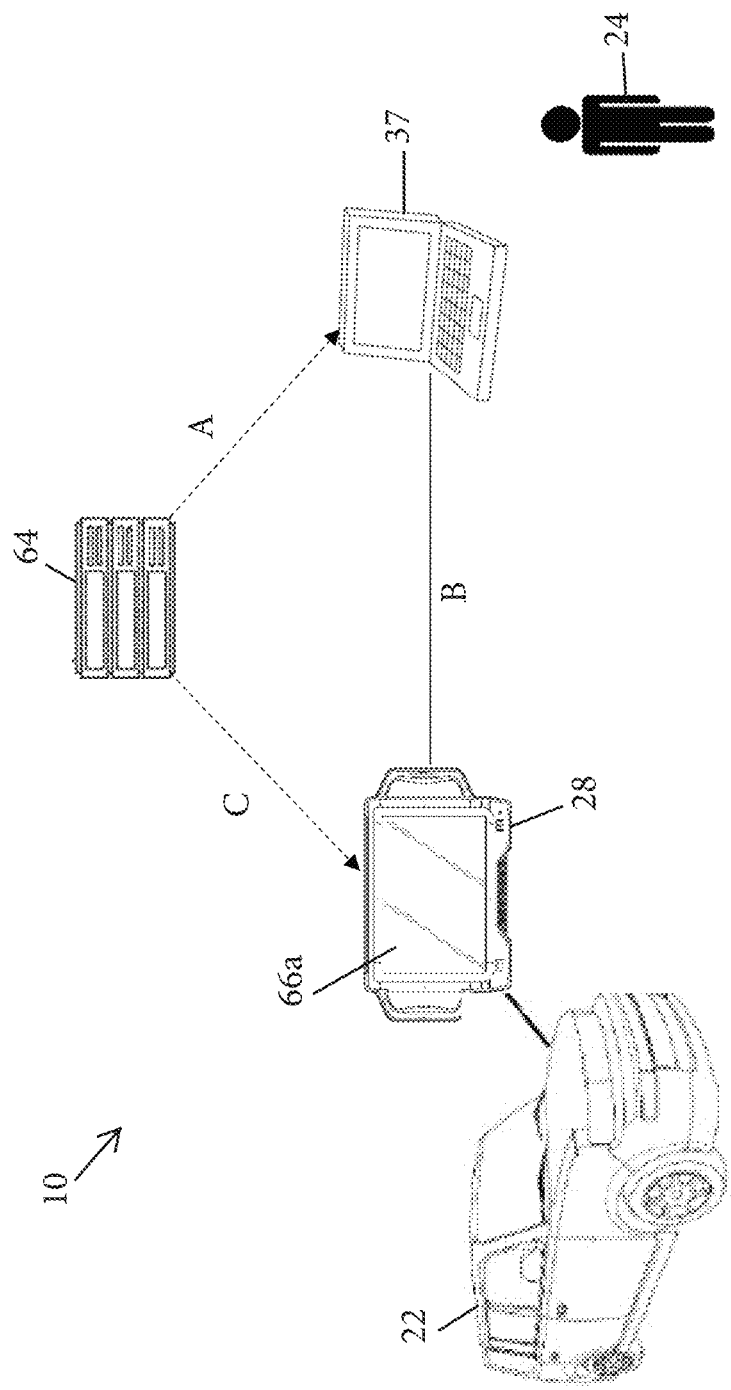

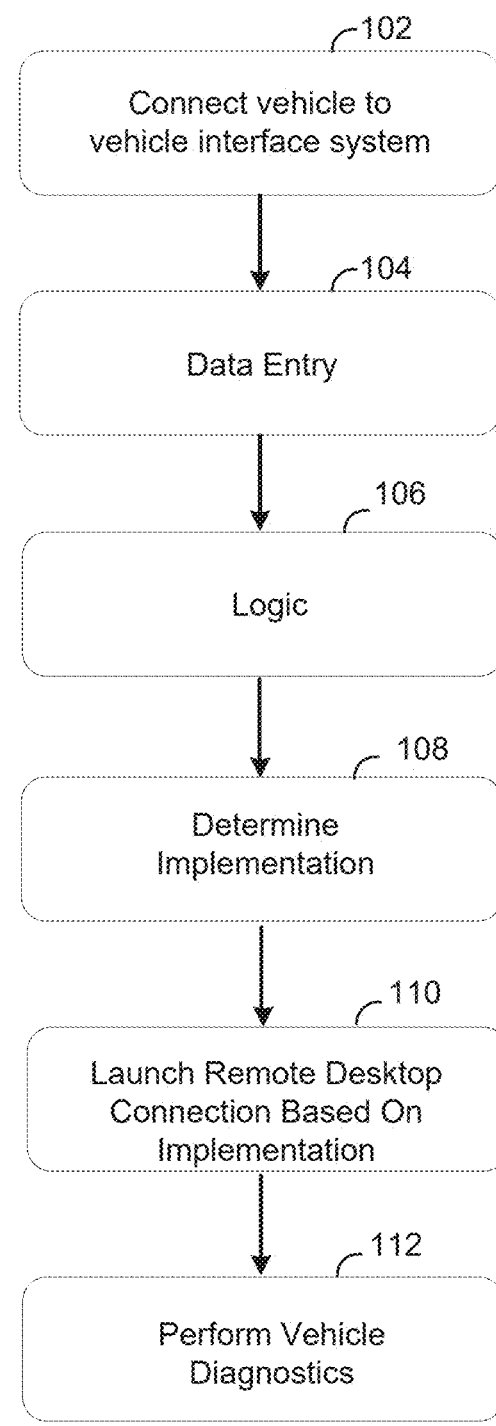

VEHICLE DIAGNOSTIC SYSTEM AND METHOD WITH AUTOMATED CONNECTIVITY TO DIAGNOSTIC APPLICATION

BACKGROUND OF THE INVENTION

The present invention is directed to a vehicle diagnostic system and method, and in particular to a vehicle diagnostic system and method that provides automated connectivity to a particular diagnostic application between computer devices using a remote desktop connection, and may also be employed to present selectable available diagnostic application options on a screen of a computer device for selection by a user that are directed for the particular vehicle to be serviced. The system and method may additionally provide a selectable option for presenting and running an automated diagnostic application via an alternative connection. Still further, the system and method may also utilize a credential management software or program for access to and use of diagnostic applications.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an OEM or an aftermarket diagnostic company. The diagnostic programs or applications may include user login screens for managing user access to the programs of applications, with each user utilizing unique credential sets for each diagnostic application.

SUMMARY OF THE INVENTION

The present invention provides a vehicle diagnostic system and method for diagnosing a particular vehicle that is to be serviced, and in particular to a vehicle diagnostic system that provides automated connectivity to a particular diagnostic application between computer devices, such as a diagnostic computer tool, laptop computer and a remote server, where the diagnostic software program may be located on the diagnostic tool or on a remote server, and where the connectivity configuration is determined via a connection logic program and is aided through a remote desktop connection application that is configured or preconfigured for the particular connection that is to be made. Still further, an application manager program may be employed for presenting on a screen of a computer device selectable options of available diagnostic software programs for selection by a user, where the selectable options are for diagnostic software programs for use with the particular vehicle to be serviced. The application manager program may be configured to be part of or operate in combination with or separate from connection logic. Alternatively and/or additionally, the connection logic program and/or application manager program may be used to configure an alternative connection between computer devices in which a diagnostic navigation program is used to automatically facilitate the operation/ running of a diagnostic software program, including presenting a user selectable option for operating in such manner. Still further, the system may additionally provide controlled credential access to diagnostic applications with credential manager software based on user profiles and credentials that are stored in memory. The credential manager is configured to access the user's profile and automatically populate login fields of the selected diagnostic application with relevant credential information.

A method of facilitating access to one or more vehicle service programs for servicing an electronic system of a vehicle with a vehicle diagnostic computer tool at a repair facility, where the vehicle diagnostic computer tool is configured to interface with the electronic system of a vehicle for operation of a vehicle service program for servicing the vehicle, comprises storing in computer memory a profile file for each of one or more users, where each profile file comprises credential data for a selected user for accessing one or more vehicle service programs, providing credential manager software configured to access user profile files to obtain credential data, using the credential manager software to selectively obtain credential data of a selected user for a selected vehicle service program, and supplying the credential data for the selected user with the credential manager software to the selected vehicle service program to access the selected vehicle service program for servicing the vehicle.

In one configuration the storing in computer memory comprises storing credential data for a plurality of diagnostic software applications. The diagnostic software applications may comprise original equipment manufacturer (OEM) diagnostic software applications, some of which may be stored on remote computer devices, such as servers, that are remote from the repair facility. Profile files for a plurality of users may be stored, and the profile files may be stored in memory of the diagnostic computer tool.

In a further configuration, the method includes receiving login data from a user with the credential manager software selectively obtaining credential data of a selected user based on the login data.

The method may also include supplying the credential data with the credential manager software to the vehicle service program via one or more fields displayed on a screen of a computer device, including where the one or more fields displayed are displayed on a screen of the diagnostic computer tool. Still further, the credential manager software may automatically populate the fields with the credential data. The credential data may comprise a user name and password for each of a plurality of vehicle service programs. The profile files may be retained in memory with the credential manager software.

According to an alternative embodiment, a method of facilitating access to a plurality of original equipment manufacturer (OEM) diagnostic software applications for servicing electronic systems of vehicles with a vehicle diagnostic computer tool configured for operation of a selected diagnostic software application for servicing a vehicle, comprises storing in computer memory a profile file for each of one or more users, where each profile file comprises credential data for a selected user for accessing the plurality of diagnostic software applications, providing credential manager software configured to access user profile files to obtain credential data, using the credential manager software to selectively obtain credential data of a selected user to a selected diagnostic software application for accessing the selected diagnostic software application to service the vehicle, and supplying the credential data for the selected user with the credential manager software to the selected diagnostic software application via one or more fields displayed on a screen of a computer device.

Still further a vehicle diagnostic system for controlling access to diagnostic software programs to service an electronic system of a vehicle at a repair facility, the system comprising a vehicle diagnostic computer tool configured to access a plurality of diagnostic software programs based on credential data supplied to the diagnostic software programs, where the vehicle diagnostic computer tool is configured to interface with an electronic system of a vehicle for operation of a selected diagnostic software program for servicing the vehicle. The system includes a profile file stored in memory for each of one or more users, where each profile file comprises credential data for a selected user for accessing one or more vehicle service programs, and includes credential manager software configured to access user profile files to obtain credential data. The credential manager software is configured to selectively obtain credential data of a selected user to a selected diagnostic software application for accessing the selected diagnostic software application to service the vehicle, and is configured to selectively supply the credential data for the selected user to the selected diagnostic software application.

In accordance with a particular embodiment, the credential manager software is configured to supply the credential data to the selected diagnostic software application via one or more fields displayed on a screen of a computer device. In a still further configuration, the credential manager software receives login data from a user, with the credential manager software configured to selectively obtain credential data based on the login data.

In any of the embodiments connection manager software may comprise connection logic software configured for use in determining the one or more diagnostic software programs useable for servicing the vehicle, application manager software for use in displaying the one or more user selectable designations corresponding to the one or more diagnostic software programs, and the credential manager software. The application manager software may further be used for receiving a user selected designation of the selected diagnostic software program.

The system and method of the present invention provides an accurate and automated connection to a diagnostic software program for servicing a vehicle that is determined and selected based on particular selection criteria, with the system launching a connection between computer devices that minimizes or eliminates the human action required for making the connection and accessing the correct diagnostic software program. The system and method enable a diagnostic software program to be more rapidly and accurately accessed, as well as optimize the connection between devices for allowing use of a diagnostic software program to service a vehicle using a computer device on which the diagnostic software is not loaded. The system and method may additionally present selectable diagnostic software program options to a user that are specific to the vehicle to be serviced, such as based on the make, model and/or service required, where a user is able to selectably launch a desired one of the presented diagnostic software program options. Still further, the system and method may alternatively be used to present a selectable operation to have an automated operation of a selected diagnostic software program used to perform the desired service on the vehicle. Still further, the system and method may be further configured to retain and manage the credentials for one or multiple users by accessing a user's profile from a database of user profiles and selectively populating the login fields for a selected diagnostic software application. These and other objects, advantages, purposes and features of this invention will become apparent upon review of the following specification in conjunction with the drawings.

BRIEF DESCRIPTION OF THE DRAWINGS

FIG. 1C illustrates a third use case connection configuration of the system of FIG. 1 in which diagnostic software programs on a remote cloud server are accessed via a locally located diagnostic computer tool or a locally located computer for servicing the vehicle;

FIG. 5 is a flow diagram illustrating steps to a method for establishing automated connectivity to a particular diagnostic application program between computer devices using a remote desktop connection;

DESCRIPTION OF THE PREFERRED EMBODIMENTS

The present invention will now be described with reference to the accompanying figures, wherein the numbered elements in the following written description correspond to like-numbered elements in the figures.

Figure 1:
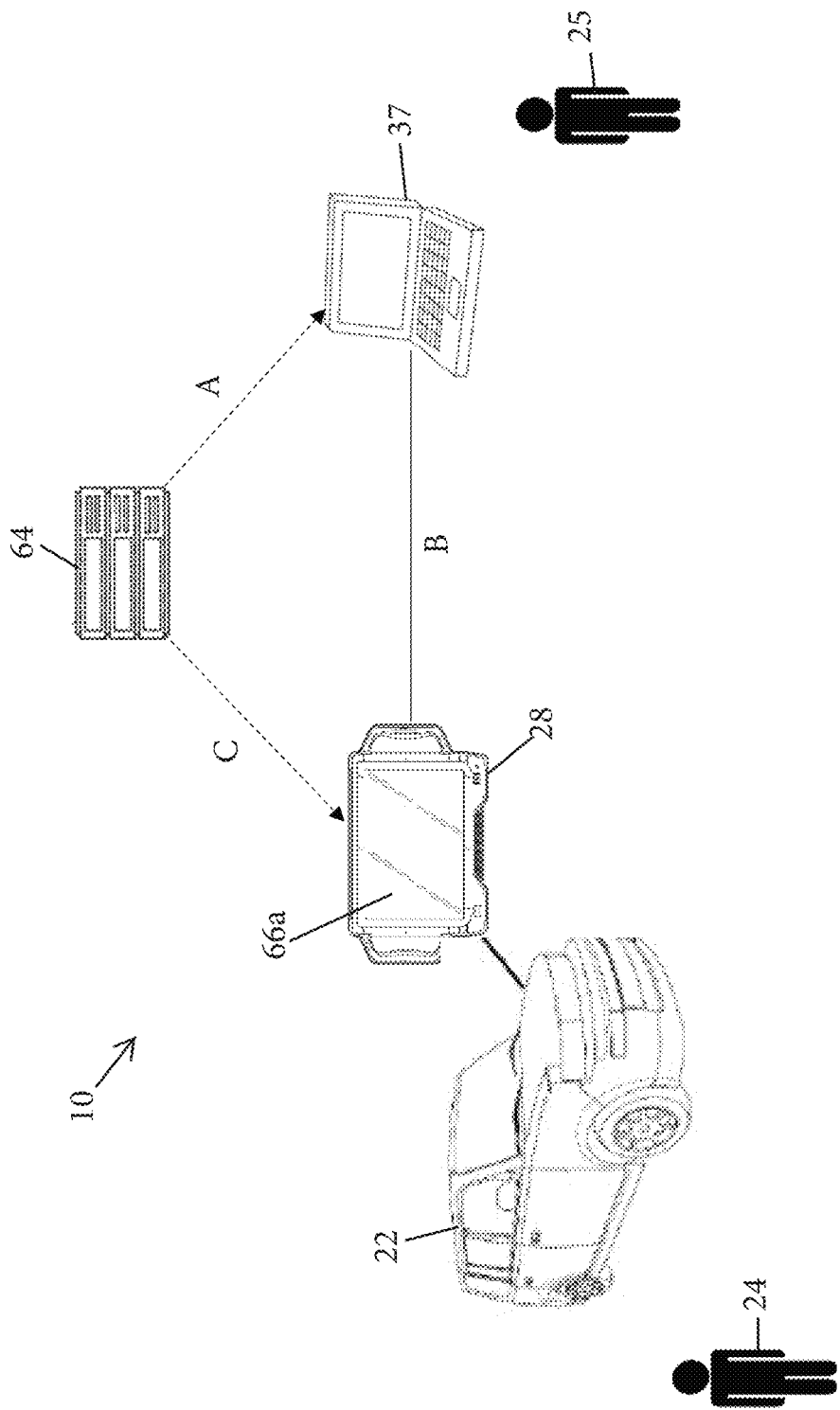
FIG. 1 is a diagram of a vehicle diagnostic system in accordance with the present invention showing computer devices comprising a vehicle diagnostic tool connected to the electronic system of a vehicle where the diagnostic tool is further connected to a portable computer device and/or a remote server.
Figure 2:
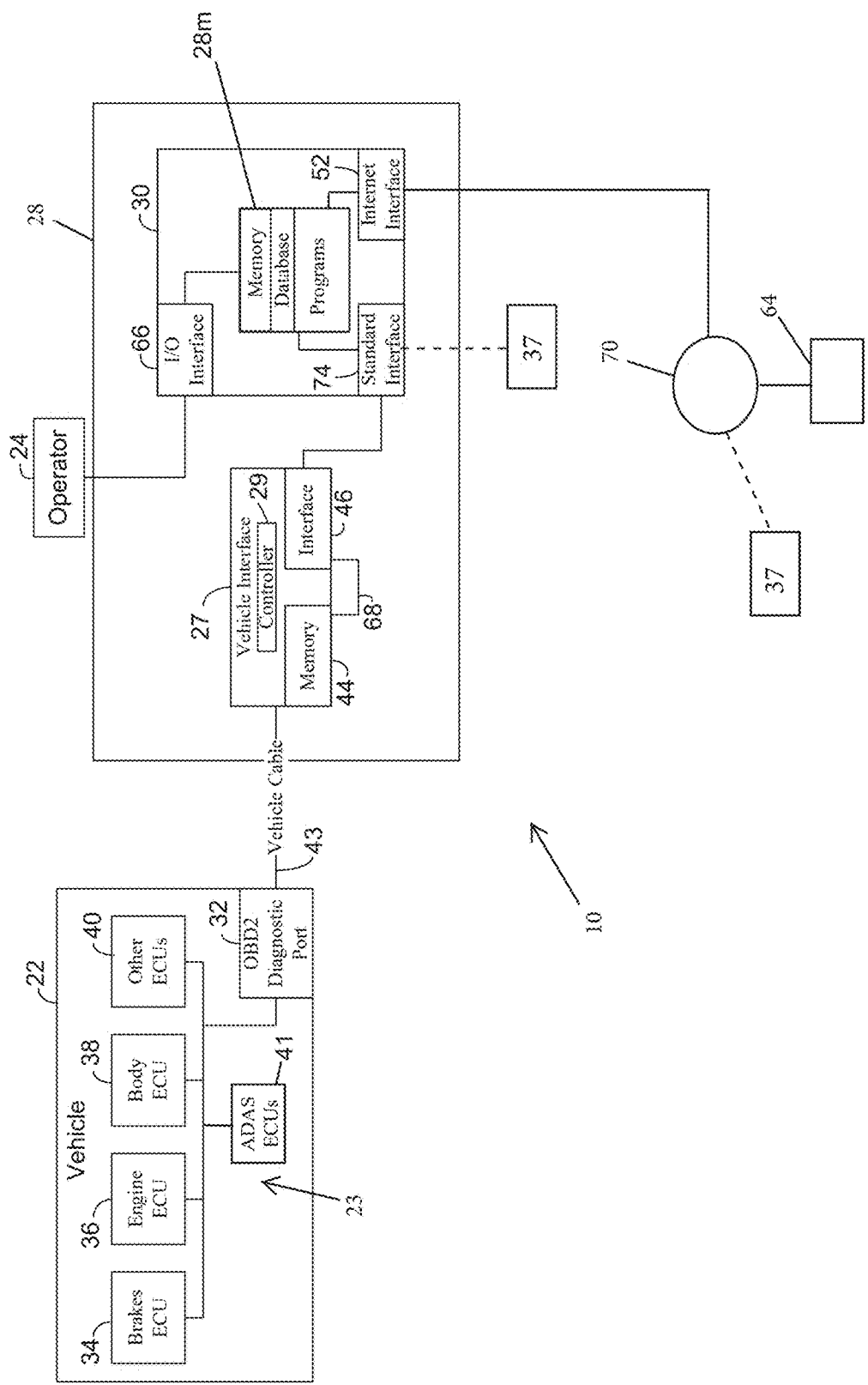
FIG. 2 is a block diagram of the vehicle diagnostic system in accordance with the present invention showing the diagnostic tool in relation to the electronic system of the vehicle.

A vehicle diagnostic system 10 for servicing a vehicle 22 is shown for use by a user such as a mechanic or operator 24, such as in an automotive repair facility. System 10 is illustrated in FIGS. 1 and 2 as including a number of computer devices, including a vehicle diagnostic tool 28, which as discussed in more detail below, is connected with vehicle 22 by operator 24, such as by connecting to an on-board diagnostic ("OBD") diagnostic port 32 of the vehicle 22 for use in servicing the electronic system 23 of vehicle 22, including various vehicle electronic control units (ECUs), such as an engine ECU 34, body ECU 36, brakes ECU 38, and/or other ECUs 40, including safety systems such as Adaptive Driver Assistance Systems ("ADAS") ECUs 41, and including other electronic parts and components of vehicle 22. Vehicle diagnostic tool 28 is shown connected with port 32 via vehicle cable 43 and may be used to scan, diagnose and/or program the electronic system 23 of vehicle 22, such as by scanning, to obtain diagnostic scan data 26, such as to determine any fault codes in the electronic system 23, which may be reported as diagnostic trouble codes ("DTCs") to thereby provide an indication to the mechanic/operator 24 as to what repairs are needed on vehicle 22.

With continued reference to FIG. 1, system 10 further includes one or more additional computing devices 37 and/or 64. In the illustrated embodiment computing device 37 is illustrated as a portable computer, such as a laptop computer, but may alternatively be a desktop or other form of computer. As discussed below, depending on the particular use case configuration, laptop computer 37 may be local to the repair facility for use by mechanic 24 or may be remote from the repair facility for use by a technician 25, such as at a remote repair or tech facility in which communications with the diagnostic tool 28 are provided over a computer network, such as via the internet. Also in the illustrated embodiment, computing device 64 is illustrated as server, such as a remote cloud server or remote rack server, which is remote from the repair facility with communications with diagnostic tool 28 and/or computer 37 likewise being enabled by a computer network, such as the internet. Although shown as a single remote server 64 in FIG. 1, it should be understood that numerous remote servers 64 may be available in system 10. For example, remote servers 64 may be associated with a given original equipment (OE) supplier that supports its own diagnostic software thereon. For example, there may be separate remote servers 64 for each of a plurality of original equipment manufacturers (OEMs), such as the Ford Motor Company or the Toyota Motor Corporation. Or a remote server 64 may be associated with a remote technician at a remote technical assistance center.

As discussed in more detail below, diagnostic software programs or application programs 53 are used in the scanning, diagnosing and/or flashing of the electronic system 23 of vehicle 22, where such programs may be stored in memory on diagnostic tool 28 itself and/or may be stored in memory on server 64, where server 64 is accessible by a technician, or may be stored in computer 37. Due to the wide variety of makes and models of vehicles and associated diagnostic programs, a mechanic 24 at a repair facility may not have direct access to all possible diagnostic programs and/or be proficient in the use and operation of all such diagnostic software programs. Accordingly, the mechanic 24 may obtain assistance from a technician 25, such as a technician located remotely from the repair facility whereby such a remote technician 25 aids in using the diagnostic scan tool 28 with the diagnostic software program 53. Still further, it may also be desirable to employ a portable computer 37 for use in running diagnostic software with diagnostic tool 28 depending on the configuration of diagnostic tool 28. In any of the various cases, as discussed in more detail below, establishing the proper connection needed between the diagnostic tool 28 and the portable computer 37 and/or server 64 for running the appropriate diagnostic software 53 for the particular vehicle 22 to be serviced is facilitated by a connection logic program 51 and remote access or connectivity software or program 54, where the connection logic 51 aids in the implementation decision process and configuration and launching of the remote access software 54 for connection between the diagnostic tool 28 and the portable computer 37 and/or the server 64. Still further, an application manager program 50 may be employed for presenting on a screen of a computer device selectable options of available diagnostic software 53 for selection by a user, where the selectable options are for diagnostic software 53 for use with the particular vehicle 22 to be serviced. The application manager program 50 may be configured to be part of or operate in combination with or separate from connection logic 51, as well as facilitate the launching of the remote access software 54 for connection between selected computer devices as well as launching of the selected diagnostic software 53. In accordance with a further embodiment, an alternative or additional option may be presented to a user for selection of an automated operation of a diagnostic software program 53 for use with the particular vehicle 22 to be serviced, including by way of an alternative connection between computer devices.

Figure 3:
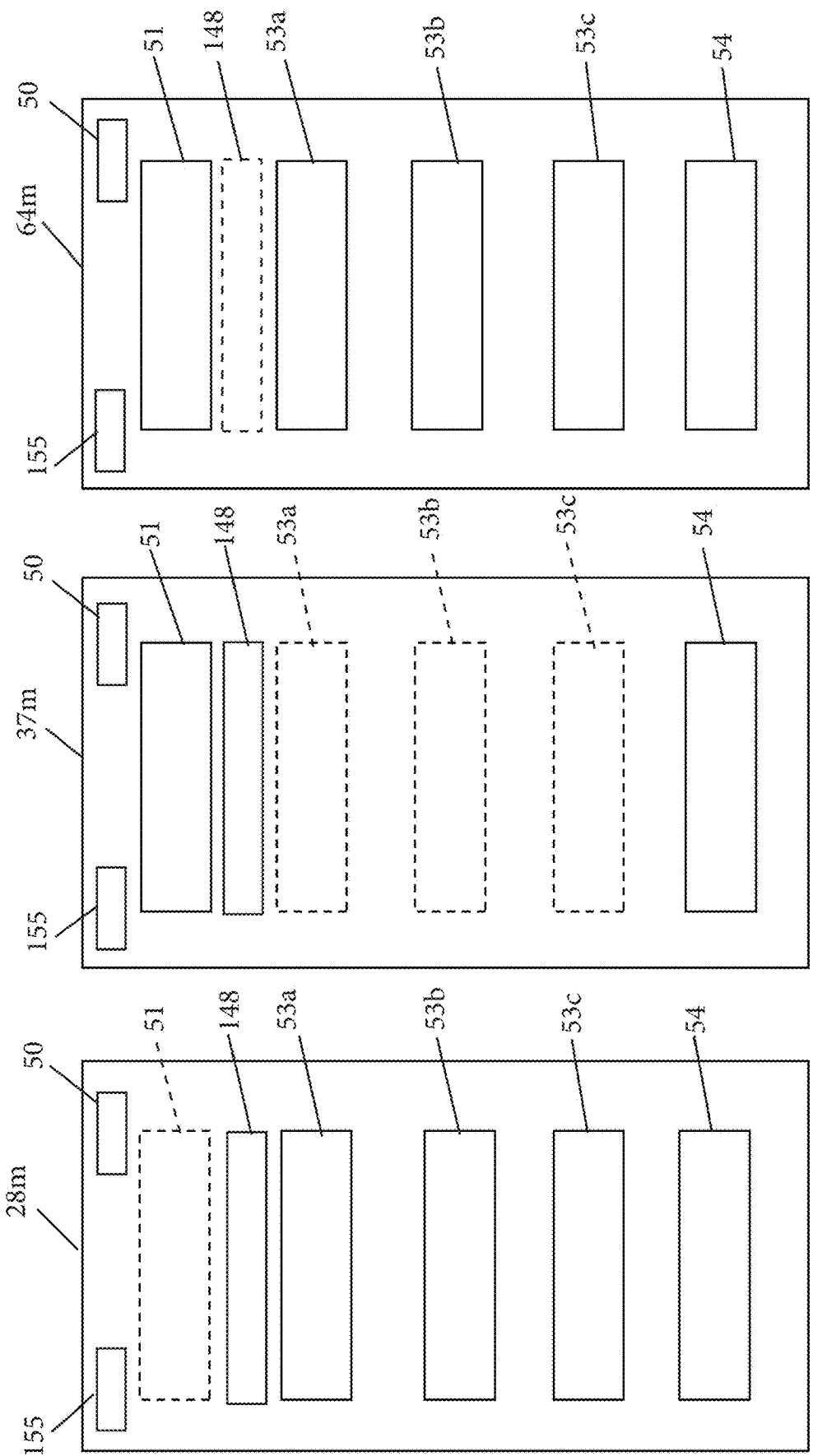
FIG. 3A is a block diagram of a plurality of potential programs contained within memory of the diagnostic tool of FIGS. 1 and 2.
FIG. 3B is a block diagram of a plurality of potential programs contained within memory of the server of FIGS. 1 and 2.
FIG. 3C is a block diagram of a plurality of potential programs contained within memory of the laptop of FIGS. 1 and 2.

Various use cases or connection configurations between the diagnostic tool 28 and the computer 37 and/or server 64 may be established, including a local connection or cloud/remote connection, for servicing vehicle 22, where the connections are made based on and using various software programs installed in memory of the diagnostic tool 28, computer 37 and/or server 64. FIGS. 3A-3B illustrate various potential software program configurations that may be contained within memory 28*m* of diagnostic tool 28, memory 37*m* of computer 37 and memory 64*m* of server 64. As shown in FIG. 3A, memory 28*m* of diagnostic tool 28 includes remote connectivity or access software 54 and may include one or more diagnostic software programs 53 illustrated at 53*a*, 53*b*, 53*c*, where the diagnostic programs may be supplied by an OEM and be OE programs or may be aftermarket programs, and may also include connection logic 51. As shown in FIG. 3B, memory 37*m* of computer 37 includes connection logic program 51 and remote connectivity software 54. As shown in FIG. 3C, memory 64*m* of server 64 includes connection logic program 51 and remote connectivity software 54, and includes one or more diagnostic software programs 53*a*, 53*b*, 53*c*. Depending on the configuration of system 10, diagnostic tool 28 may include connection logic 51 and computer 37 may include one or more diagnostic software programs.

Figure 1A:
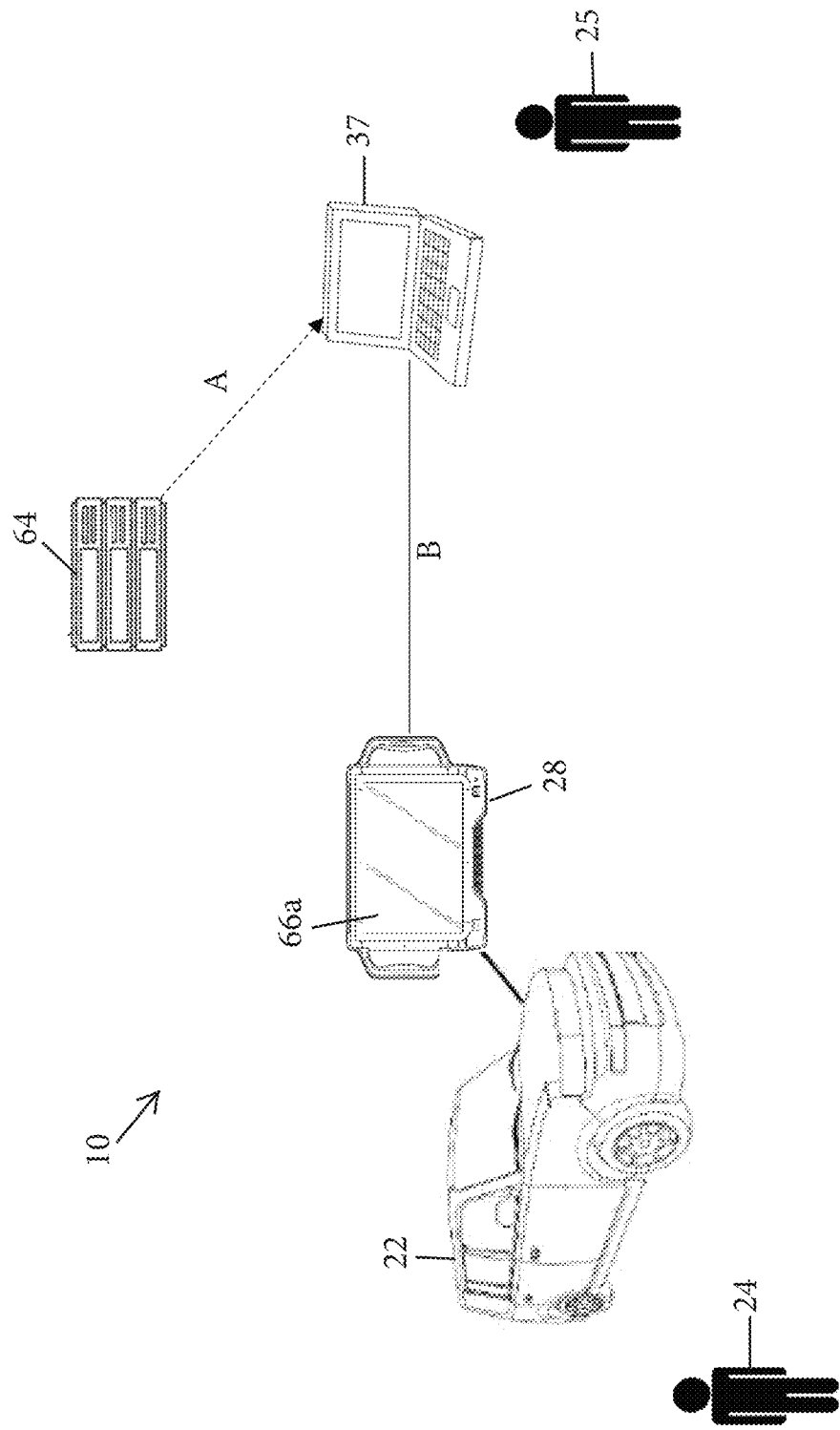
FIG. 1A illustrates a first use case connection configuration of the system of FIG. 1 in which diagnostic software programs on a remote cloud server are accessed via a remote computer for servicing the vehicle.

A first use case or connection configuration of system 10 is illustrated in FIG. 1A and involves the use of a diagnostic software program 53 located on remote server 64 that is connected with computer 37, where computer 37 is remote from both server 64 and the diagnostic tool 28 of the repair facility. In such a remote cloud configuration, a technician in a remote repair facility or tech center uses computer 37 accessing a diagnostic program 53 on the server 64 for running on diagnostic tool 28 to perform diagnostic service on vehicle 22, such as connections at A and B in FIG. 1A, where the diagnostic software program 53 on server 64 operates on diagnostic tool 28 through computer 37. Alternatively, a diagnostic software program 53 may communicate with diagnostic tool 28 via a connection at C of FIG. 1 under control of remote computer 37.

Figure 1B:
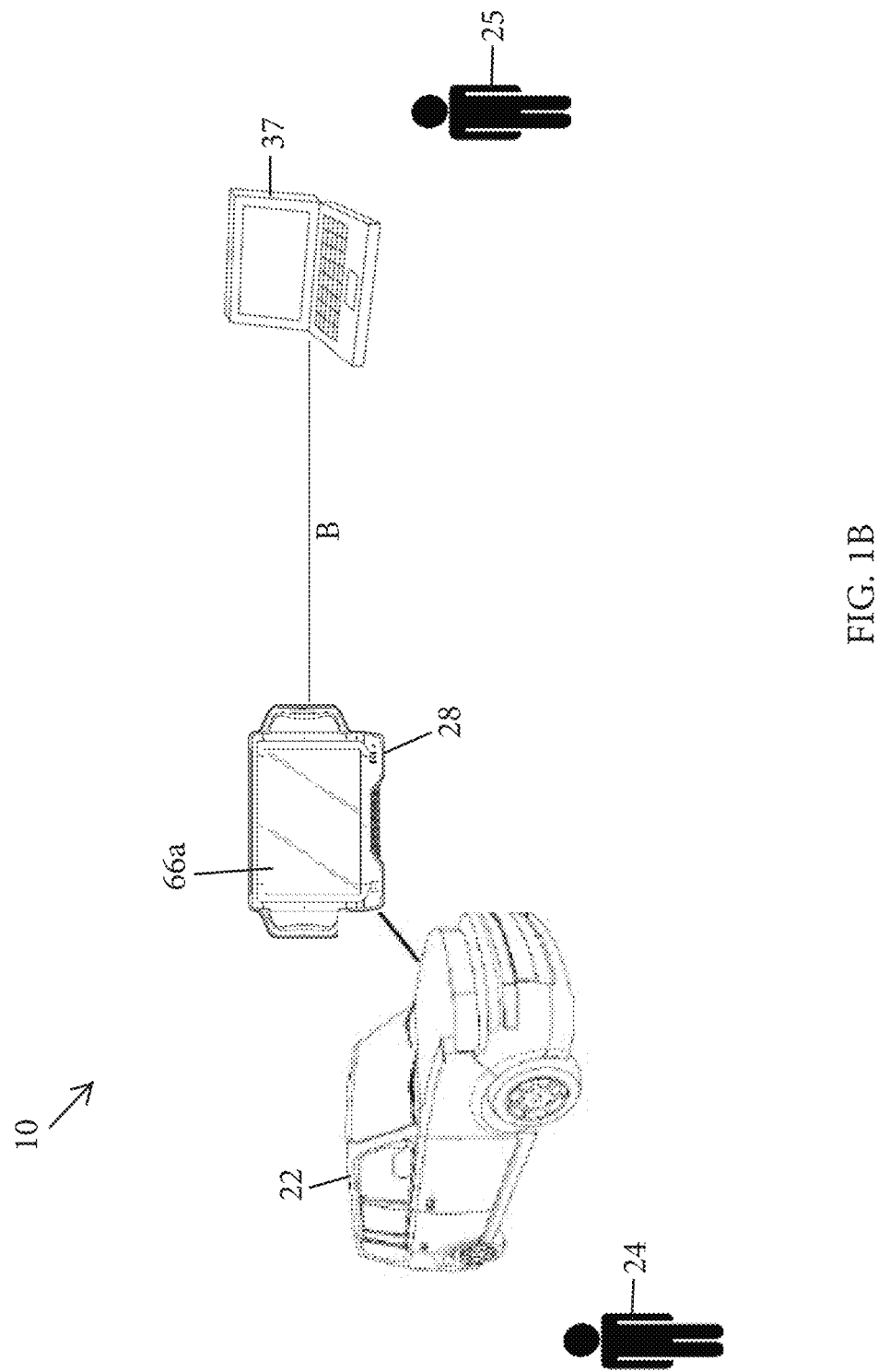
FIG. 1B illustrates a second use case connection configuration of the system of FIG. 1 in which diagnostic software programs on a diagnostic computer tool are accessed via a remote computer for servicing the vehicle.

A second use case or connection configuration of system 10 is illustrated in FIG. 1B and involves the use of a diagnostic software program 53 located on diagnostic tool 28 that is communicatively coupled with computer 37, where computer 37 is remote from the diagnostic tool 28 of the repair facility, such as a connection at B in FIG. 1. In such a remote local configuration, a technician 25 in a remote repair facility or tech center uses remote computer 37 accessing a diagnostic program 53 on the diagnostic tool 28 to perform service on vehicle 22.

A third use case or connection configuration of system 10 is illustrated in FIG. 1C and involves the use of a diagnostic software program 53 located on remote server 64 that is in communication with the diagnostic tool 28, such as a connection at C in FIG. 1. In such an onsite cloud configuration, the diagnostic tool 28 may additionally be connected with a computer 37 that is disposed locally in the repair facility, depending on the type of or configuration of the diagnostic tool 28. Still further, if a local computer 37 is used within the repair facility, the diagnostic software program 53 located on server 64 may be in communication with the diagnostic tool 28 through the computer 37, such as a connection at A and B, with computer 37 being local to the repair facility.

Figure 1D:
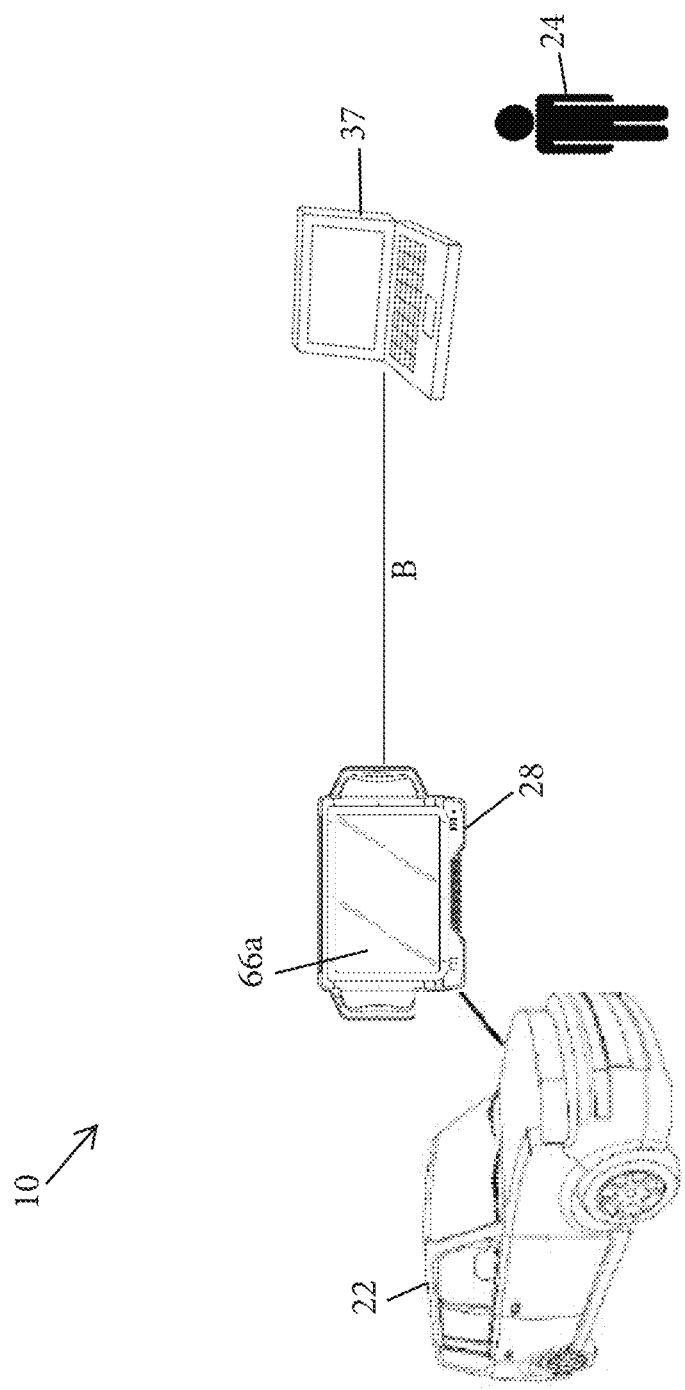
FIG. 1D illustrates a fourth use case connection configuration of the system of FIG. 1 in which diagnostic software programs on a locally located diagnostic computer tool are accessed via a locally located computer for servicing the vehicle.

A fourth use case or connection configuration of system 10 is illustrated in FIG. 1D and involves the use of a diagnostic software program 53 located on diagnostic tool 28 that is connected to a computer 37 that is disposed locally in the repair facility, such as a connection at B in FIG. 1D, establishing an onsite local configuration.

It should be appreciated that not all of the illustrated software programs shown in FIGS. 3A-3B need be present on the devices in all of the various potential alternative use configurations. For example, in the first use case of FIG. 1A noted above, diagnostic tool 28 need not include diagnostic software programs, or those that are located on the diagnostic tool 28 are not used. Still further, it should be understood that although diagnostic tool 28 and server 64 are shown as each including diagnostic software programs 53*a*, 53*b*, 53*c* that diagnostic tool 28 and server 64 need not include the same diagnostic software programs. That is, the diagnostic software programs 53*a*, 53*b*, 53*c* on diagnostic tool 28 may be different than the diagnostic software programs 53*a*, 53*b*, 53*c* on server 64. By way of further example, server 64 may include original equipment (OE) diagnostic software programs for many models of one particular make of vehicle, or may include many OE diagnostic software programs for many different makes and models of vehicles, with diagnostic tool 28 including different diagnostic software programs or no such diagnostic software programs. As discussed below, the particular diagnostic software programs present on the diagnostic tool 28 and/or server 64 are factors in the automated selection and implementation of the connection configuration for servicing a given vehicle 22.

As noted, the type of connection configuration that is used between diagnostic tool 28 and computer 37 and/or server 64 depends on numerous factors, including as evaluated by connection logic program 51. Such factors include the make, model and/or year of vehicle 22 to be serviced, the location and/or availability of diagnostic software programs, including whether the diagnostic software programs are the latest release or the update level or revision of the diagnostic software programs and whether the diagnostic software programs are located on the cloud server 64 and/or the diagnostic tool 28. Still further, in the case of OE diagnostic software, this may include determining the remote server 64 associated with an OEM for use thereof. The connection configuration may further depend on what licensed access to the diagnostic software programs is available to the technician 24 at the repair facility, including as may be directly licensed by the repair facility or as may be provided via a license acquired by a remote repair facility. This may include, by way of further example, any limitations on the number of uses of particular diagnostic software programs over a given period of time that a repair facility may be licensed to and whether the facility has already used its licensed allotment. The configuration of the connection may also be determined or established based on the type of service for vehicle 22 that is being requested, such as whether the electronic system 23 is being scanned, or existing codes are being read, or if the electronic system 23 is being flashed. For example, if flashing of electronic system 23 is required, may want to implement a connection in which diagnostic software 53 used on a diagnostic tool 28 is used due to faster operations, including based on proximity. The configuration of the connection may also be determined based on the availability or accessibility of cloud server 64, distance from the cloud server 64 to the diagnostic tool 28, including based on internet speed and latency from cloud server 64 to diagnostic tool 28.

Still further, the type of connection configuration established may additionally be based on the availability of diagnostic automation functions, such as disclosed in commonly owned U.S. Pat. No. 11,538,290 or application Ser. No. 17/177,927, both of which are incorporated herein by reference in their entireties.

Figure 4:
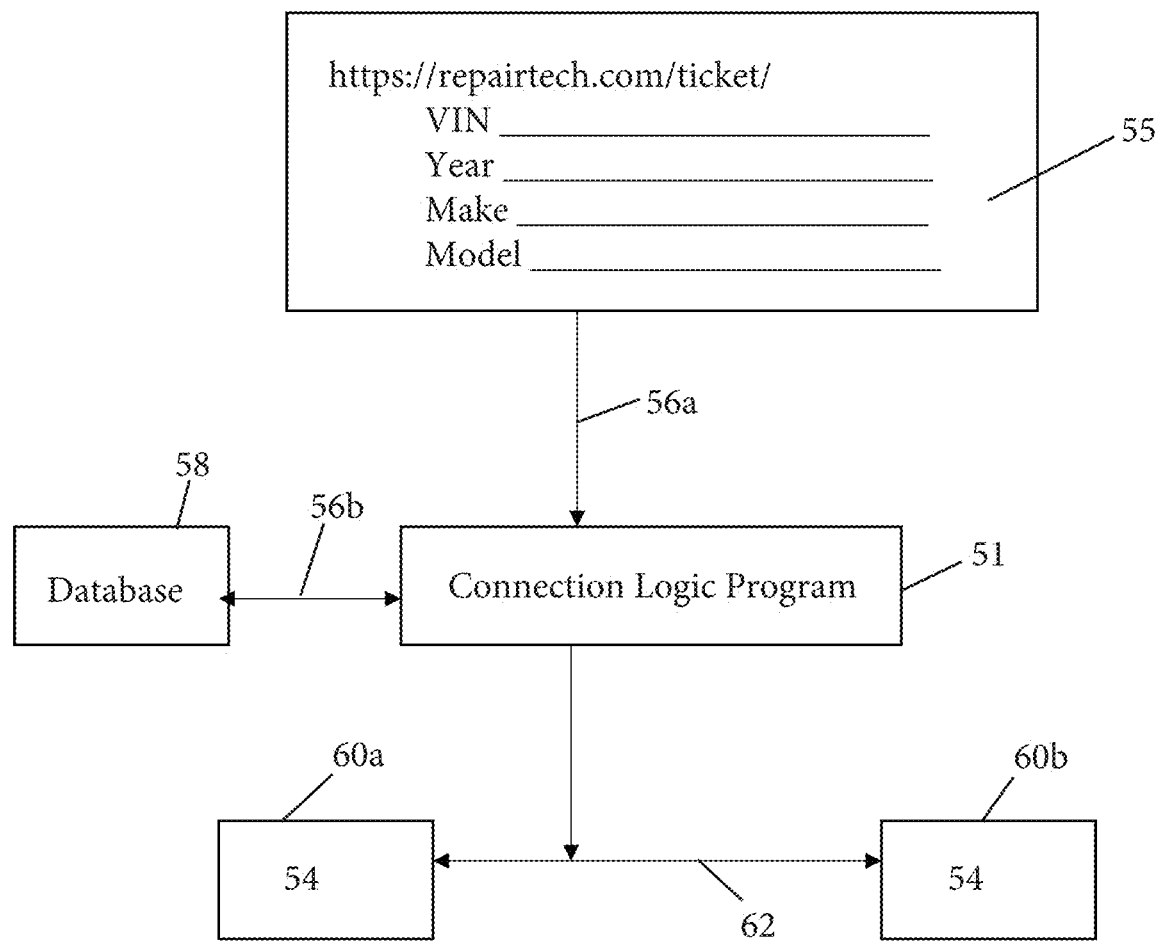
FIG. 4 is a block diagram illustrating the supply of input data to a connection logic program for launching a connection between devices of the system of FIG. 1 of a plurality of programs contained within memory of the separate computer device of FIGS. 1 and 2.

With reference to FIG. 4, in operation a connection is initiated between the diagnostic tool 28 and the computer 37 and/or the server 64 based on inputs 55 generating input data 56*a* submitted by or entered into the diagnostic tool 28 or entered into an electronic support ticket entered via another computing device such as by a technician 24 via a web browser, as well as may be based on input data 56*b* that may be retrieved or looked up or provided from one or more computer memories or databases 58. The entered input data 56*a* may include, for example, information about the vehicle 24 to be diagnosed, including the vehicle identification number (VIN), make, model and/or year, as well as other information such as the service to be performed on the vehicle 22, the identification of the diagnostic tool 28 to be used with the vehicle 24 and the available diagnostic software programs 53, including the revision levels of such programs 53. The entered input data 56*a* is then supplied to the connection logic program 51, which may be present on the server 64, laptop 37 and/or diagnostic tool 28. Various input data 56*a* may also or alternatively be automatically determined, such as upon connecting a diagnostic tool 28 with a vehicle 22 and reading the VIN of the vehicle to ascertain the make, model and/or year, where that data along with identifying data regarding the diagnostic tool 28 itself, such as its IP address or other designator, as well as information regarding the diagnostic software programs 53 disposed on the diagnostic tool 28, may be automatically provided to the connection logic program 51. It should further be appreciated that the connection logic program 51 may comprise one or more modules, and may be disposed in only one location or interoperate between devices, such as the server 64, laptop 37 and/or diagnostic tool 28. For example, in the use case configurations of FIGS. 1A and 1B, the connection logic 51 determining the connection to make and launching the determined connection may be located in memory 37*m* of remote computer 37, or may interact with connection logic 51 within the remote server 64 and/or diagnostic tool 28. In the use case configuration of FIG. 1C, the connection logic 51 may be in the diagnostic tool 28 and/or the local computer 37 and be run to automatically connect to one of a number of potential servers 64, and/or to automatically connect to and launch the determined diagnostic software 53 from a plurality of potential diagnostic software programs 53 disposed on a given server 64.

Additional input data 56*b* to the connection logic program 51 from one or more information storage or databases 58 may also be provided to or obtained by the logic program 51. For example, databases 58 may include details regarding the different types of diagnostic tools 28 present at a repair facility, the diagnostic software programs 53 stored in memory 28*m* on the diagnostic tools 28, including the revision levels of those diagnostic software programs 53. Databases 58 may additionally include credential information for a given repair facility and/or user, such as a mechanic 24, including credentials for accessing the connectivity programs 54 and diagnostic software programs 53. Databases 58 may further include identification information of the computer devices of system 10, such as the internet protocol (IP) addresses of the diagnostic tools 28, computers 37 and servers 64 for use in configuring connections there between. Databases 58 may further include file path information for the given computer devices of system 10 regarding the location of programs thereon, and in particular file path location of diagnostic software programs 53. For example, in the use case of FIG. 1A, databases 58 may include IP addresses for one or more servers 64 as well as file path information regarding one or more diagnostic software programs 53*a*, 53*b*, 53*c* disposed thereon.

Still further, connection logic program 51 may ascertain or determine latency issues or distances between the diagnostic tool 28 and the laptop 37 and/or server 64. This may include, for example, evaluating the connection between the devices, including by detecting the transmission speed between the devices. Alternatively and/or additionally, system 10 may track latency based on past connections for use in determining a connection. The latency of a connection may be based on various factors, including the make and model of the vehicle 22 being serviced, including specific ECUs being accessed, as well as internet service providers (ISPs) that are being used between a repair shop and the respective outside computer devices. Accordingly, system 10 may track data of such connections and include a learning module as part of database 58 for use in determining and/or establishing a connection between computer devices.

Connection logic 51 may alternatively automatically determine or identify the diagnostic tool 28 supplying input data 56, such as by the Internet Protocol (IP) address of the device from which the connection logic program 51 receives the input data 56. The connection logic program 51 may also automatically receive identifications of the available diagnostic software programs 53 on the diagnostic tool 28 being used and their associated revision levels to confirm that they are up to date. If a diagnostic software program 53 is determined to not be up to date, such as a diagnostic software program 53 on diagnostic tool 28 for example, the system 10, such as via program 51, may initiate an update to the program 53. Such an update may occur without notification on the display screen 66*a* of the tool 28 such that the technician 24 is not aware of the update taking place.

Based on the input data 56 (56*a* and/or 56*b*), connection logic 51 determines the type of connection configuration to implement for servicing vehicle 24, which is based on an evaluation of some or all of the above discussed criteria encompassed by the input data 56, including potentially weighing some or all of the criteria for optimization of the servicing of vehicle 24, which may include scanning, diagnosing and/or programing of the electronic system 23. In addition to determining the type of connection configuration to implement, connection logic 51 additionally launches a point-to-point preconfigured remote access connection session, which is configured at least in part based on the input data 56, via the remote access software 54 and creates a connection 62 there between, including a screen share connection whereby a user of one computer device is able to see and control operation of a diagnostic software program on another device, such as an OE diagnostic software program 53 for use in servicing the vehicle 22.

As noted above, each of the diagnostic tool 28, laptop 37 and server 64 devices includes remote access software 54, where remote access software may be TEAMVIEWER brand remote access software, or be another existing remote access software supplied by another company, or be custom developed for the particular application. As is known, remote access software 54 enables connectivity through a graphical interface exchanged over the internet via a TCP/IP remote exchange protocol to establish a pair of endpoints 60*a*, 60*b* as between the diagnostic tool 28, computer 37 or server 64, where the endpoint devices each include cooperative remote access software 54 to establish the connection 62. For example, in the remote cloud first use case of FIG. 1A discussed above, the remote server 64 may comprise one endpoint 60*a* and the remote computer 37 may comprise the other endpoint 60*b*, where the connection 62 thus corresponds with the connection A shown in FIG. 1. The user of computer 37 is thus able to access a diagnostic program 53 on server 64, as well as see a control screen associated with server 64 and operate the diagnostic program 53 as if it were operating on the computer 37. The control screen associated with server 64 may be a virtual screen. In the remote local second use case of FIG. 1B, the remote computer 37 may comprise one endpoint 60*a* and the diagnostic tool 28 may comprise the other endpoint 60*b*, where the connection 62 corresponds with the connection B in FIG. 1. The user or technician 25 operating computer 37 is thus able to access a diagnostic program 53 on diagnostic tool 28, as well as see on the screen of the computer 37 the information displayed on screen 66*a*, including operating the diagnostic program 53 as if it were operating on the computer 37. In the onside cloud configuration of the third noted use case of FIG. 1C, the cloud server 64 comprises one endpoint 60a and the diagnostic tool 28 comprises the other endpoint 60b, where the connection 62 thus corresponds with the connection C of FIG. 1, but as noted if a separate local computer 37 is employed with the diagnostic tool 28 the local computer 37 may be the other endpoint 60b whereby the connection 62 thus corresponds with the connection A of FIG. 1. In either case, the local mechanic 24 at the repair facility using the diagnostic tool 28 or computer 37 is able to access a diagnostic program 53 on the server 64, as well as see a control screen associated with server 64 and operate the diagnostic software 53 as if it were operating on the local diagnostic tool 28 or local computer 37. And in the onsite local configuration of the fourth noted use case of FIG. 1D, the local computer 37 comprises one endpoint 60a and the diagnostic tool 28 comprises the other endpoint 60b, with the connection 62 thus corresponding with the connection B of FIG. 1. In this situation, a user of the local computer 37, such as a mechanic 24, is thus able to access a diagnostic program 53 on the diagnostic tool 28, as well as see the control screen 66a associated with diagnostic tool 28 on the computer 37, and operate the diagnostic program 53 as if it were operating on the computer 37.

As noted, in addition to launching the point-to-point remote access connection session between the determined devices, connection logic 51 also configures or preconfigures the remote access software 54 to automatically make the connection between the selected devices. This includes making the connection without input from a user at either endpoint 60a, 60b, such as without a user having to enter any credentials, such as passwords or the like, or without having to select a particular device requiring connection from a plurality of devices, or having to select a given diagnostic software program 53, all of which are entered or populated or designated by the connection logic 51. This configured connection thus does not allow or require the user, such as the mechanic 24 in the repair facility or a technician 25 at the remote repair facility, to select from available computer devices, and/or enter credentials for access to the computer devices or diagnostic software 53 thereon, and/or locate or navigate to a file path of a given diagnostic software program 53, and instead configures and/or launches a connection to the correct devices, such as to the correct one of a plurality of available diagnostic tools 28 or the correct one of a plurality of possible cloud servers 64, and including connecting with the pre-determined appropriate diagnostic software program 53. For example, upon receiving input data 56a, such as regarding the make, model and/or year of vehicle 22 to be serviced, the service to be performed thereon, and determining potential computer devices and diagnostic software applications 53 for use in performing the vehicle service, one or more desired or potential connection configurations may be determined that may be made based on determined configuration data, including based on identification of computer devices, such as by IP address, and designation of the potential diagnostic software program or programs 53 useable for the service, such as by file path location on the computer devices, as well as by credentials, such as passwords and license authorization information, for use in accessing the diagnostic software application 53 at issue.

It should be appreciated that although the connection logic 51 configures the connection between the diagnostic tool 28 and the computer 37 and/or server 64, that involvement by the mechanic 24 or technician 25 may still be required for finalizing the connection and/or initiating the vehicle service using the diagnostic tool 28 and determined diagnostic software program 53. However, the devices and diagnostic software to be employed are determined and the connection there between via the remote access software 54 is launched or prepared for launch by the logic 51, and that in at least some embodiments the connection between the devices is fully established.

Upon establishing the connection 62 between the end points 60a, 60b, a user at one of the devices is able to control the other connected device to perform the service required for the vehicle 22. For example, in the remote cloud first use case of FIG. 1A discussed above, the user 25 of remote computer 37 is operably interconnected with the correct diagnostic software 53 on cloud server 64 via connection 62 to perform remote diagnostics on vehicle 22 via the internet connection between computer 37 and diagnostic tool 28, with the user at computer 37 being able to operate the diagnostic software program 53 as if it were present on computer 37. In the remote local second use case of FIG. 1B, a remote user 25 at the remote computer 37 is able to access the diagnostic software 53 on the diagnostic tool 28 via the connection 62 to thereby perform diagnostics on vehicle 22 as if the remote user 25 were at the repair facility operating the diagnostic tool 28. In such a configuration, the remote user of laptop 37 may control diagnostic tool 28 via a second or virtual screen that is not present or visible to the mechanic 24 at the repair facility. In the onside cloud configuration of the third noted use case of FIG. 1C the mechanic 24 at the repair facility is able to use the diagnostic software 53 located on the remote server 64 as if the diagnostic software 53 were loaded and running on the device at the repair facility, such as loaded on the diagnostic tool 28 or the local laptop 37. The mechanic 24 thus is viewing, interacting with and using the diagnostic software 53 that is stored and running on server 64 as if the diagnostic software 53 were stored and running on diagnostic tool 28, including viewing on the screen 66a of the diagnostic tool 28. For example, depending on the configuration of the diagnostic tool 28, discussed in more detail below, it may have hardware and software for directly interfacing with vehicle 22 without the need to interface with a local computer 37. Alternatively, however, the diagnostic tool 28 may need to further interface with local computer 37, with local computer 37 comprising the endpoint 60a for connection 62 with the remote server 64 as the opposite endpoint 60b. In the onsite local configuration of the fourth noted use case of FIG. 1D, the local computer 37 is connected with the diagnostic tool 28 to operate the diagnostic software 53 located on the diagnostic tool 28.

FIG. 5 is a flow diagram illustrating steps of a vehicle diagnostic system and method for automated connectivity to a diagnostic software program. As noted at 102, a diagnostic tool 28 may be connected to the vehicle 22, such as via the OBD connector 32. At 104 data entry 55 is made whereby data inputs 56 are supplied to the connection logic 51. It should be appreciated, that data entry 55 may be made, such as via a web browser on another computer device, prior to selecting a given diagnostic tool 28 and connecting the tool 28 to the vehicle 22. For example, the connection logic 51 may direct the mechanic 24 regarding which diagnostic tool 28 to use from a plurality of potential diagnostic tools available to the mechanic 24 at the repair facility. Upon receiving the input data 56, the connection logic 51 determines the appropriate connection configuration at 108 to make between the diagnostic tool 28 and the computer 37 and/or server 64. In addition, at 110 the connection logic 51 configures and launches the respective remote access software 54 for making the connection between the determined diagnostic tool 28 and the computer 37 and/or server 64. Upon making the determined connection, the vehicle service can be performed at 112 using the diagnostic tool 28 and the determined diagnostic software program 53.

In a further configuration of system 10, with reference to FIGS. 3A-3C, 4A and 5A, an application manager program 50 may be employed, such as being disposed within the diagnostic tool 28, computer 37 and/or server 64, where application manager 50 is configured to present a selectable option to a user of one or more diagnostic software programs 53 for use in servicing vehicle 22. The option may be presented to a user, such as a mechanic 24 or remote technician 25, upon the connection 62 being made between the endpoints 60a, 60b from the computer devices of the diagnostic tool 28, computer 37 and/or server 64, or upon determination of possible connections 62 that may be made between different endpoints 60a, 60b of the diagnostic tool 28, computer 37 and/or server 64. For example, control logic 51 may determine different options for connecting computer devices depending on the location of diagnostic software programs 53 that may be used, such as in one connection when a potential useable diagnostic software program 53 is located on the diagnostic tool 28 and/or on a local computer 37 and another potential useable diagnostic software program 53 is located on the a remote computer 37 or server 64, with application manager 50 configured to present selectable options for use of the diagnostic software program 53 on either of such a local computer device or a remote computer device.

The application manager program 50 may be separate from the control logic 51 and/or integrated with the control logic 51. Application manager 50 may receive instructions, such as from connection logic 51, regarding what selectable diagnostic software applications 53 for use with vehicle 22 to present to a user, such as to mechanic 24 or technician 25. Alternatively, application manager 50 may be configured to receive information data regarding the vehicle 22 to be serviced, as well as details regarding the potential diagnostic software applications 53 that may be used with vehicle 22, with application manager 50 performing a determination of what selectable options to present to a user. Application manager 50 may run on one computer device and present options on the screen of another computer device via the remote access software 54.

Figure 4A:
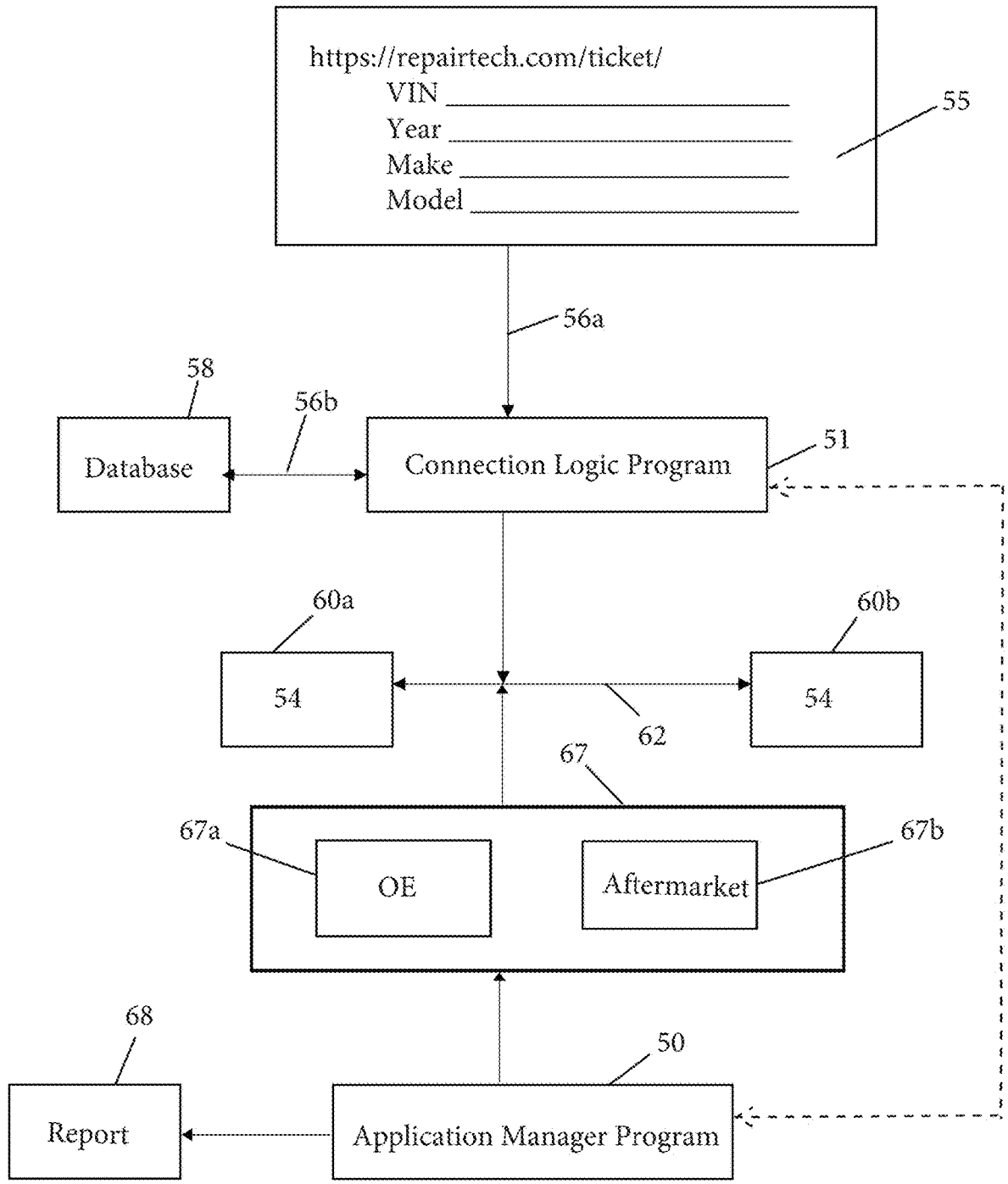
FIG. 4A is a block diagram illustrating the use of an application manager program in the arrangement of FIG. 4 for managing a connection of a diagnostic software program between devices of the system of FIG. 1.

As understood from FIG. 4A, application manager 50 is configured to present selectable options 67a, 67b in the form of an input field, such as a user selectable button or a scroll selection or a type receiving field or the like, of diagnostic software programs 53 on the screen 67 of a computer device for selection by a user of system 10, such as on screen 66a of diagnostic tool 28 or the screen of the computer 37. For example, application manager 50 may present options of either using an OE diagnostic software program or an aftermarket diagnostic software program. In particular, application manager 50 is configured to determine and present the potential available diagnostic software application programs 53 available for use with the vehicle 22 being serviced. For example, if the vehicle 22 is a Ford vehicle, application manager 50 will only present Ford diagnostic software programs 53 to the user 24, including presenting diagnostic software programs 53 specifically for use with the vehicle 22 being serviced, such as based on model, year and/or options on vehicle 22 impacting the ECUs present on electronic system 23. For example, the input data 56a may comprise a vehicle identification number (VIN) of the vehicle that is read or parsed to determine that the vehicle 22 to be serviced is a Ford vehicle based on the VIN, including the model and year. Alternatively, the user may be presented with a decision tree to select a manufacturer from a list of OEMs, then select a given year, model, as well as options on the vehicle 22. Still further, application manager 50 may also only present diagnostic software programs 53 that are determined to be up-to-date in terms of revision levels, which may be determined by logic program 51 or application manager 50.

As illustrated in FIG. 4A, application manager 50 causes a screen 67 of a computing device to present the selectable options to a user, where in the illustrated embodiment screen 67 may be the screen 66a of the diagnostic tool 28 or may be the screen of the computer 37, or another such computer device. In the illustrated embodiment this includes, for example, presenting a button or input 67a for selecting an OE diagnostic software program 53 and a button or input 67b for selecting an aftermarket diagnostic software program 53, where application manager 50 is configured to receive interface inputs from a touchscreen, keyboard and/or mouse. As noted, this may be presented to a local mechanic 24 at a repair facility on the screen 66a of the diagnostic tool or the screen of a local computer such as a laptop 37 at the repair facility, or may presented to a remote technician 25 on the screen of a computer such as a laptop 37 at a remote technician location. Although shown in the illustrated embodiment of FIG. 4A as presenting a single OE diagnostic program 53 and a single aftermarket diagnostic program 53, it should be appreciated that more than one of each such diagnostic programs may be presented on the screen 67 for selection by a user. Alternatively only a single diagnostic software program 53 option may be presented on a screen. As discussed, application manager 50 may only present a selectable input 67a option for use of an OE diagnostic software program 53 if the diagnostic software program 53 is available and up-to-date, such as may be determined by connection logic program 51.

Figure 5A:
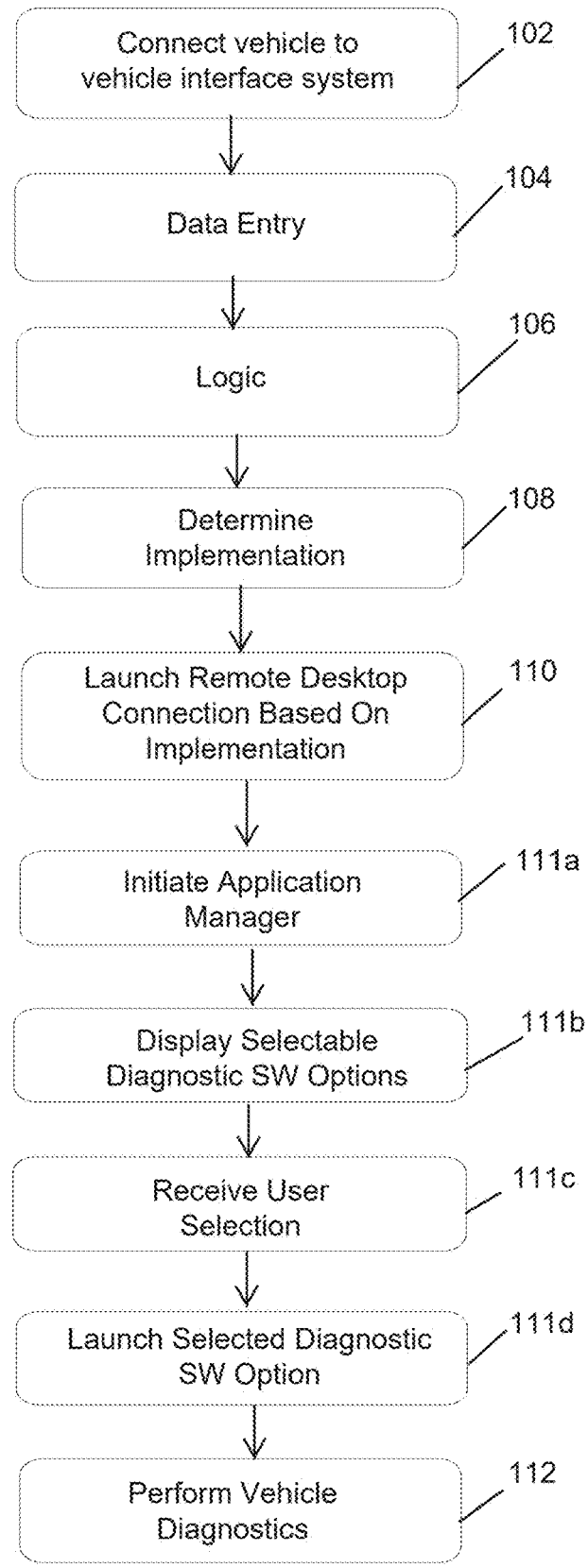
FIG. 5A is a flow diagram illustrating steps to a method for establishing connectivity utilizing an application manager program as disclosed in FIG. 4A.

With reference to FIG. 5A, an exemplary flow of the steps of the vehicle diagnostic system and method 10 employing the application manager program 50 is illustrated, which is similar to the system illustrated in FIG. 5. As discussed, upon receiving the input data 56, the connection logic 51 determines the appropriate connection configuration at 108 to make between the diagnostic tool 28 and the computer 37 and/or server 64, and at 110 the connection logic 51 configures and launches the respective remote access software 54 for making the connection between the determined diagnostic tool 28 and the computer 37 and/or server 64. Upon making the determined connection, the application manager program 50 is launched at 111a, such as by way of the connection logic 51. Application manager 50 then presents selectable options for diagnostic software programs 53 on a screen 67 for selection by a user at 111b, such as between an OE diagnostic program 53 and an aftermarket diagnostic program 53. Upon selection by the user at 111c, such as by a mechanic 24 at a local repair facility or a remote technician 25, system 10 launches the selected diagnostic software program 53, such as via application manager 50. The vehicle service can then be performed at 112 using the diagnostic tool 28 and the determined diagnostic software program 53. It should be appreciated that alternative steps to the vehicle diagnostic system and method 10 may be involved other than as illustrated in FIG. 5A. For example, the vehicle 22 need not be connected to the vehicle interface or diagnostic tool 28 for purposes of determining the implementation 108 to use, and instead the determined implementation 108 may include determining which diagnostic tool 28 to utilize for the service of vehicle 22. Still further, the step of determining the implementation 108 may include multiple potential connections 62 that may be made between different endpoint 60a, 60b computer devices. Accordingly, prior to initiating a given connection 62, the application manager 50 may present selectable options to a user, such as a mechanic 24 or remote technician 25. Upon such a user selecting a given software to use, the application manager 50 and/or connection logic 51 may launch the connection 62 required for use of the user selected diagnostic software program 53, including configuring the remote access software 54 for establishing the connection 62, which as noted may include not only designating the computer devices, such as by IP address, but also the file paths for the associated diagnostic software program 53, as well as entry of the credentials for use of the diagnostic software program 53. For example, upon the step of determining one or more implementations 108, system 10 may not perform the step 110 of launching the remote desktop connection until after the steps 111a, 111b and 111c of initiating the application manager program 50, displaying the selectable options on a screen 67, such as determined by connection logic 51, and receiving the user selection. Upon receiving the user selection, the step 110 of launching the remote desktop connection and launching the selected diagnostic software program 53 may then be performed. Moreover, the application manager program 50 may launch the remote desktop connection 62, based on the input data 56, and launch the selected diagnostic application program 53.

It should be appreciated that one or more of the particular diagnostic software application programs 67a, 67b being displayed on a screen 67 for selection by a user may not be located on the computer device of the screen 67. For example, the OE diagnostic program 53 may reside on a remote cloud server 64 and the aftermarket diagnostic program 53 may reside on the local diagnostic tool 28 or local computer 37, or vice versa. In the use case embodiment of FIG. 1C, for example, the screen 67 may be the screen 66a of the diagnostic tool or the local laptop 37 at the repair facility, but the selectable OE diagnostic program 53 may be located on the remote server 64. Moreover, the screen 67 on which a selectable option may be presented may comprise a virtual screen accessible through the remote desktop connection 62 that is not visible to a user at one of the endpoints 60a, 60b. For example, in the use case of FIG. 1B in which diagnostic programs 53, including an OE diagnostic program 53 are located on the local diagnostic tool 28, the potential selectable diagnostic programs 67a, 67b may be displayed to a remote technician 25 operating the remote computer 37 on a virtual screen 67 of the diagnostic tool 28 that is not viewable by the local mechanic 24.

System 10, such as through application manager 50, may additionally be used to track the usage of a given diagnostic program 53, including for purposes of billing and/or license usage. It should be appreciated, for example, that the use of an OE diagnostic program 53 may be limited by a license, such as for a number of times over a given time period and/or require a separate charge for each use. Application manager 50 may monitor the data exchange over connection 62 of the use of a given diagnostic program 53 to determine not only that the diagnostic program 53 was launched, but that it was successfully used in the service of vehicle 22 or used to the extent that a licensed or billable use of the diagnostic program 53 occurred. That is, not only did a user such as a mechanic 24 or remote technician 25 select the given diagnostic program 53 via screen 67, but that the diagnostic program 53 was actually used through the vehicle communication interface exchange of data between the diagnostic tool 28 and electronic system 23. Thus, a user is not charged merely for selecting the particular diagnostic program 53, but based on the actual use of the diagnostic program 53. This prevents inadvertent charges when for some reason the actual service is terminated, such as through a power failure or disconnection of computer devices. System 10, such as through application manager 50, will report the successful usage of the diagnostic program 53 through a data transmission 68, which may be reported to a remote computer for monitoring and billing purposes, where the remote computer may be the server 64 or a remote computer 37 or another computer device.

In addition to tracking usage of diagnostic programs 50, system 10 may additionally selectively take and record screen shots from any of the various computer devices, including diagnostic tool 28, computer 37 or another computer device for documenting and verifying actions of the service process, including the connection and completion of the service. The screen shots may be reported by being transmitted along with the diagnostic program usage via the data transmission 68, or may be separately reported.

In an alternative configuration an application manager program 50 may be employed, such as being disposed within the diagnostic tool 28, computer 37, or the remote server 64, where application manager 50 is configured to directly receive input data 56 and present selectable options of diagnostic software programs 53 on the screen of a computer device for selection by a user of system 10. For example, the inputs 55 that include at least information regarding the vehicle 22 to be serviced, such as make, model and year information may be supplied as input data 56a to the application manager 50. Based on input data 56a, application manager 50 processes the received information for determining which potential diagnostic software application programs 53 may be presented to the operator 24 for use with the vehicle 24 to be serviced, such as options of either using an OE diagnostic software program or an aftermarket diagnostic software program. The application manager 50 may also obtain or receive input data 56b from one or more databases or memories 58, where input data 56b may provide information regarding the revision levels of the diagnostic software programs 53, such as to confirm that an available OE diagnostic software program is up-to-date. The input data 56b may be looked up by the application manager 50. Upon receiving the input data 56a and/or 56b, application manager 50 will determine the potential available diagnostic software application programs 53 available for use with the vehicle 22 being serviced. For example, if the vehicle 22 is a Ford vehicle, application manager 50 will only present Ford diagnostic software programs 53 to the user 24, including presenting diagnostic software programs 53 specifically for use with the vehicle 22 being serviced, such as based on model, year and/or options on vehicle 22 impacting the ECUs present on electronic system 23. Application manager 50 may then cause a screen 67 of a computing device to present the selectable options to a user, where in the screen 67 may be the screen 66a of the diagnostic tool 28 or may be the screen of the computer 37, or another such computer device, including presenting a button or input 67a for selecting an OE diagnostic software program 53 and a button or input 67b for selecting an aftermarket diagnostic software program 53, where application manager 50 is configured to receive interface inputs from a touchscreen, keyboard and/or mouse. This may be presented to a local mechanic 24 at a repair facility on the screen 66a of the diagnostic tool or the screen of a local computer such as a laptop 37 at the repair facility, or may presented to a remote technician 25 on the screen of a computer such as a laptop 37 at a remote technician location. Still further, application manager 50 may only present a selectable input 67a option for use of an OE diagnostic software program 53 if it is available and up-to-date. Upon the user selecting a given diagnostic program 67a, 67b, application manager 50 may cause connection logic program 51 to then establish the connection 62 between the relevant endpoint 60a, 60b computer devices and launch the selected diagnostic program 53.

It should be appreciated that application manager 50 and connection logic 51 may be interoperative as a connection manager software or program, including comprising various modules or subprograms that interact or operate together, or may alternatively operate separately from each other to obtain the above noted results of determining and launching a connection between computer devices, as well as providing a selectable option of diagnostic programs 53 for use in servicing a vehicle 22. Accordingly, such connection manager software may comprise either one or both of the noted operability and functionality of the application manager 50 and connection logic 51 software programs. Still further, application manager 50 and/or connection logic 51 may be used to update certain diagnostic application programs 53. For example, if a given OE diagnostic program 53 is stored on a diagnostic tool 28 or a local computer 37 at the repair facility, application program 50 may be used to download an update to the OE diagnostic application program 53 without interaction by the mechanic 24.

In a still further configuration of system 10, with reference to FIGS. 3A-3C, 4B and 5B, the connection manager software, including the connection logic 51 and/or application manager 50, may be used to present a still further selectable option to a user for automated running of a diagnostic software program 53 for use in servicing vehicle 22, such as for scanning, diagnosing and/or programming the electronic system 23. In this embodiment, a user, such as a mechanic 24 or technician 25, is presented with one or more additional selectable input fields 67c, 67d on the screen 67 of a computer device for optional selection by the user, such as on a screen 66a of the diagnostic tool 28 or the screen of the computer 37. As discussed in more detail below, upon selection of one of the options of field 67c or 67d, the application manager 50 launches an alternative connection between computer devices without use of the remote access software 54, and additionally launches the diagnostic software program 53 for automatic operation via a diagnostic navigation program 155. Such an alternative connection for use of a diagnostic software program 53 may be in accordance with the disclosure of commonly owned U.S. Pat. No. 10,719,813 issued on Jul. 21, 2020, U.S. Pat. No. 11,295,277 issued on Apr. 5, 2022, U.S. Pat. No. 11,763,269 issued on Sep. 19, 2023, and/or U.S. Pat. No. 10,706,645 issued Jul. 7, 2020, all of which are hereby incorporated herein by reference in their entireties. Still further, as discussed in more detail below, the automated operation of the diagnostic software program 53 may be in accordance with the disclosure of commonly owned U.S. patent application Ser. No. 17/177,927, filed on Feb. 17, 2021, which is hereby incorporated herein by reference in its entirety.

It should be appreciated that diagnostic software programs 53 may include a hierarchical structure by which, after a given diagnostic software program 53 has been launched, navigation within the diagnostic software programs 53 must be conducted to initiate the desired diagnostic scanning, diagnosing and/or programming for the required vehicle service. This may include, for example, navigating to direct a diagnostic software program 53 to evaluate or program all or a desired portion of the electrical system 23, such as one or more of the ECUs or electronic systems of the vehicle 22. Accordingly, subsequent to the determination of the connection 62, launching of the remote desktop connection via remote access software 54 and launch of a given diagnostic navigation programs 53 a user, such as a mechanic 24 or technician 25, will still need to navigate the hierarchical structure of the diagnostic software programs 53 to run the diagnostic software program 53 in the manner to perform the desired vehicle service. An exemplary hierarchical structure of a diagnostic software program is illustrated in the incorporated by reference U.S. patent application Ser. No. 17/177,927.

Figure 4B:
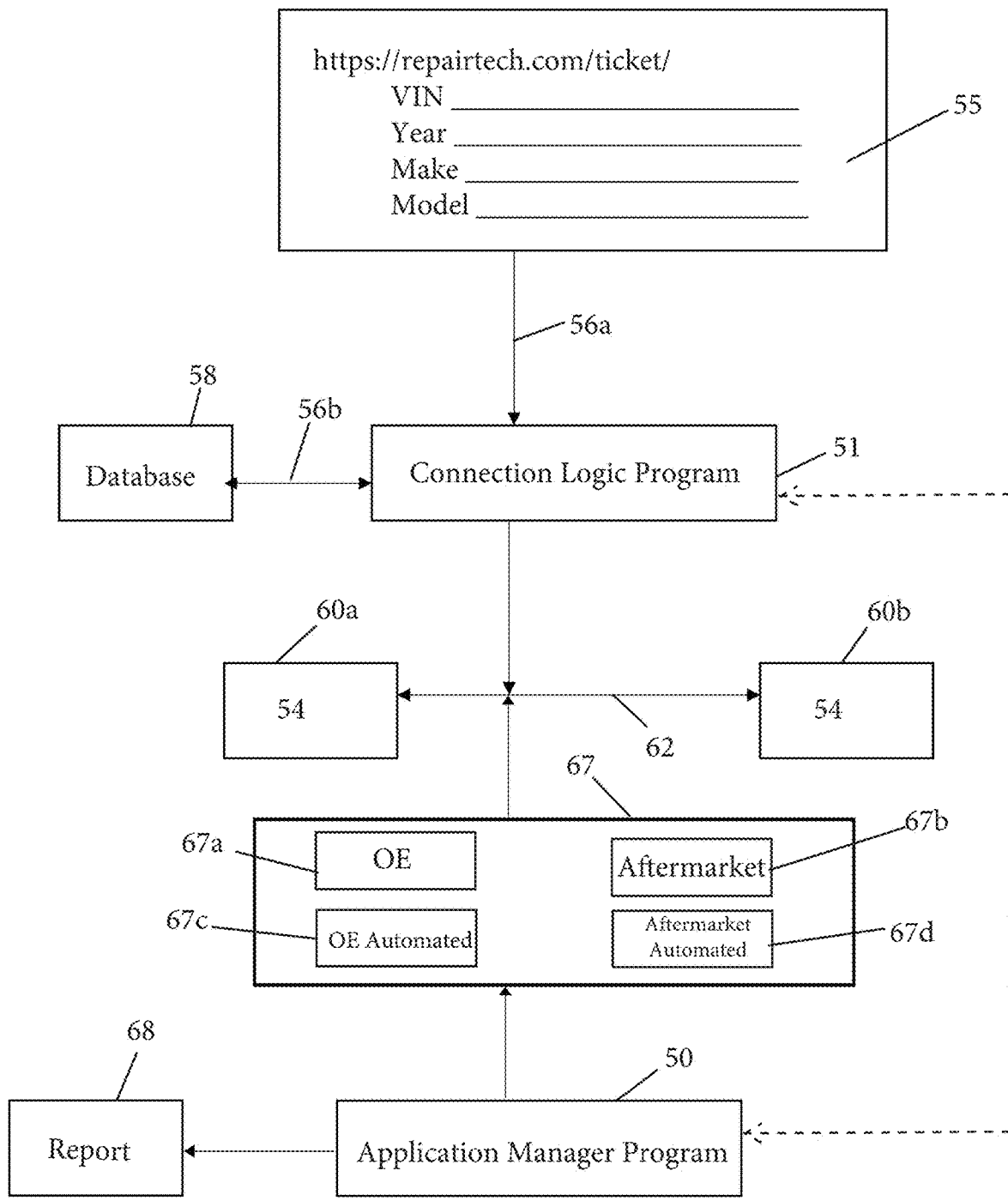
FIG. 4B is a block diagram illustrating the use of the application manager program as part of presenting a selectable option to have an automated operation of a diagnostic software program performed for servicing a vehicle.

In the embodiment of FIG. 4B, an additional or alternative option may be presented to the user for selection, that being one or more fields 67c or 67d that initiates a connection for automated operation of a selected diagnostic software program 53 using diagnostic navigation program 155. In similar manner as discussed above, input data 55 entered by a user, such as into an electronic vehicle support ticket and/or data read from an electronic system 23 of a vehicle 22, and/or along with information from one or more databases 58, provide input data 56 (56a and/or 56b) that is used by connection logic 51 to determine particular connections 62 of computer devices, such as diagnostic tool 28, computer 37 and/or server 64, for automated running of a diagnostic software program 53. This can include computer IDs for the selected computer devices, internet access connections and passwords between the selected computer devices, file paths for connecting with a desired diagnostic software program 53, as well as credentials such as passwords and license identification for accessing the diagnostic software program 53, and may include tracking and confirmation that use of a given diagnostic software program 53 is available per a license agreement. Application manager program 50, in turn, provides a display in the form of one or more selectable fields 67c, 67d on screen 67 of one of the computer devices, where as noted, fields 67c, 67d can be a user selectable button or a scroll selection or a type receiving field or the like. In the illustrated embodiment of FIG. 4B a field 67c is shown for automated operation of an OE diagnostic software application 53 and a field 67d for automated operation of an aftermarket diagnostic software application 53. It should be appreciated an alternative display may be presented, including for example only one field for automated operation may be displayed. Based on the inputs 56, as well as operation of the connection logic 51, the diagnostic software application 53 being presented for automated operation at 67c, 67d is predetermined for use with the give vehicle 22 to be serviced, as well as is selected for being usable for the service, such as based on necessary license requirements. The user may then select the diagnostic software application 53 desired for use with the vehicle 22, including whether to choose an automated operation of a diagnostic software application 53.

Upon a user, such as a mechanic 24 using a diagnostic tool 28 at a repair facility, selecting an automated deployment of a diagnostic software application 53, the application manager 50, such as in connection with the determination by the connection logic 51, may operate to launch a connection between determined computer devices, including for example based on the determined computer ID addresses, file paths and user credentials. In the embodiment in which automated operation of the diagnostic software application 53 is selected, however, the connection 62 does not require use of the remote connectivity software 54. Rather, the connection may be made by way of a network connection, such as an Internet connection between the determined computer devices corresponding to the endpoints 60a, 60b, as disclosed in U.S. Pat. Nos. 10,719,813, 11,295,277 and/or 11,763,269. That is, the connection logic 51 may still define the connection between computer device that is to be used for running the diagnostic software application 53 and servicing the vehicle 22, but the connection is not required to be made using the remote connectivity software 54. Application manager 50 may then correspondingly also launch the associated selected diagnostic software application 53 associated with the selected field 67c, 67d, which was defined based on the inputs 56 (56a and/or 56b). Still further, application manager 50 may additionally launch a diagnostic navigation program 155 for use in operating the diagnostic software application 53 that was selected to perform the desired vehicle service.

As shown in FIGS. 3A-3C, the diagnostic navigation program 155 may reside in the diagnostic tool 28, computer 37 and/or in the remote server 64. Diagnostic navigation program 155 is configured to provide predetermined inputs to the diagnostic software application 53 to perform the requested service, such as may have been defined as one of the inputs 55 to the service ticket, where the predetermined inputs navigate through the hierarchical structure of the diagnostic software application 53 to scan, diagnose and/or program the electronic system 23 of the vehicle 22, where the input signals provided by the navigation program 155 are programmed into the navigation program 155 and mapped to the hierarchal structure of the selected diagnostic software application 53. Diagnostic navigation program 155 may, for example, operate in accordance with the diagnostic navigation programs disclosed in the incorporated by reference U.S. patent application Ser. No. 17/177,927.

Figure 5B:
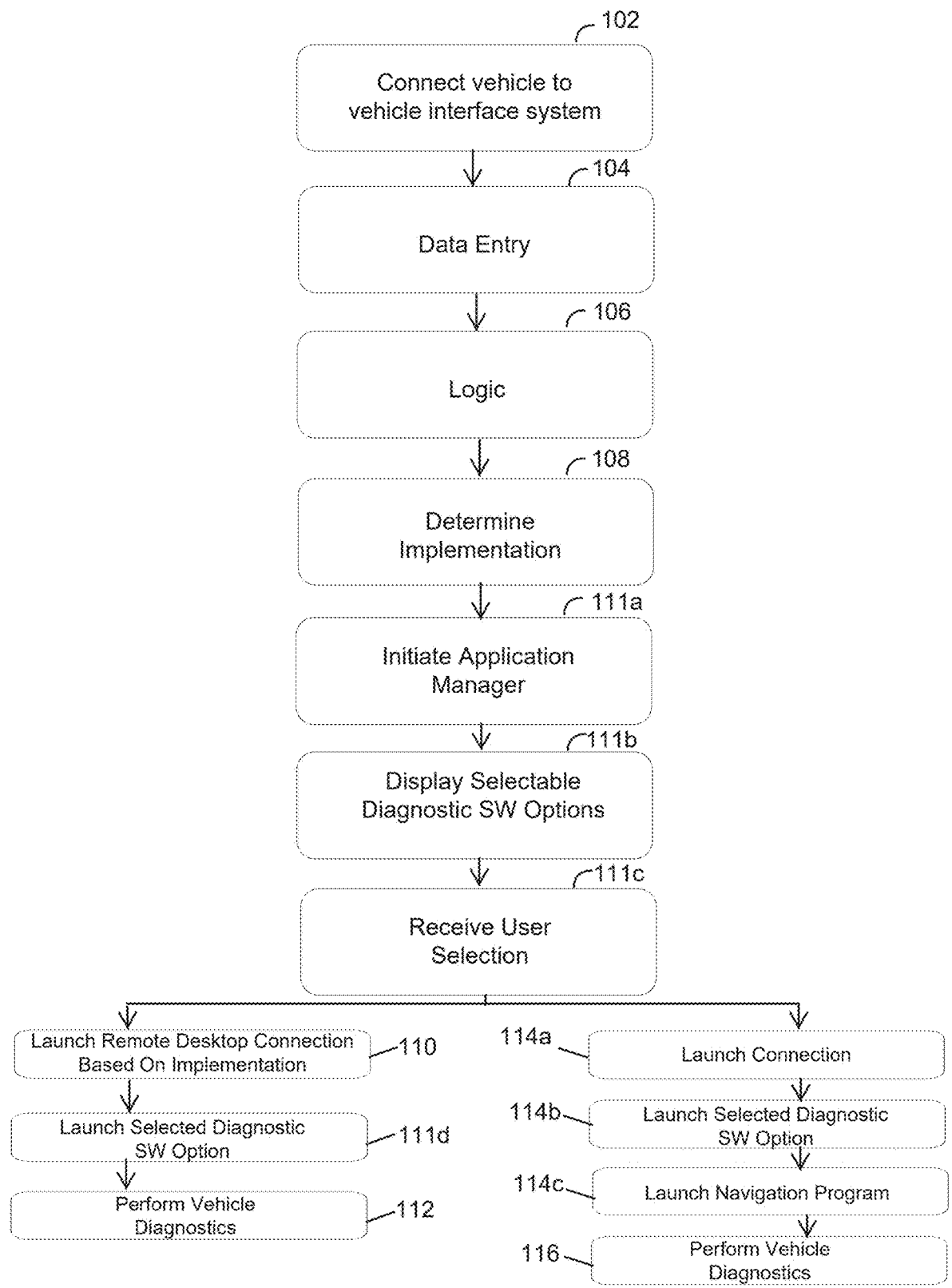
FIG. 5B is a flow diagram illustrating steps to an alternative method for establishing connectivity in which a selectable option for automated operation of a diagnostic navigation program is provided.

With reference to FIG. 5B, an exemplary flow of the steps of the vehicle diagnostic system and method 10 employing the embodiment of FIG. 4B is illustrated. As shown, upon receiving the input data 56, the connection logic 51 determines appropriate connection configurations at 108 to make between the diagnostic tool 28 and the computer 37 and/or server 64. Application manager 50 then presents selectable options for diagnostic software programs 53 on a screen 67 for selection by a user at 111b, such as between an OE diagnostic program at 67a, an aftermarket diagnostic program at 67b, an automated implementation of an OE diagnostic program at 67c, or an automated implementation of an aftermarket diagnostic program at 67c. Upon selection by the user at 111c, such as by a mechanic 24 at a local repair facility or a remote technician 25, system 10 either configures and launches a connection at 110 using the remote desktop software 54 and launces the user selected diagnostic application program 53 at step 111d to enable the vehicle service to be performed at 112, or alternatively system 10 configures and launces a connection at 114a without using the remote desktop software 54, and subsequently launces the user selected diagnostic software application 53 at 114b as well as the diagnostic navigation program 155 at step 114c to enable the service to be performed at 116.

By way of example, in the embodiment of FIG. 1C, the screen 67 may be the screen 66a of the diagnostic tool 28 or a screen of a computer 37 local to the repair facility, with the selected diagnostic software application 53, such as an OE diagnostic software application 53 associated with the selection field 67c residing on the remote server 64. Upon the mechanic 24 at the repair facility selecting the automated diagnostic software application 53 associated with field 67c, the system 10 launches the connection between the remote server 64 and the diagnostic tool 28 (or local computer 37), launches the OE diagnostic software application 53 residing on the remote server 64, and launches the diagnostic navigation program 155 for running the OE diagnostic software application 53 through the scan tool 28.

It should be appreciated that the diagnostic navigation program 155 shown in each of FIGS. 3A-3C may comprise multiple individual diagnostic navigation programs, sub-programs or modules for use with multiple different makes and models of vehicles, including for use with different diagnostic software applications 53 for such makes and models of vehicles, and may also include different such programs, sub-programs or modules depending on the service to be performed on the vehicle 20, such as scanning or programming, depending on the service requested as may be defined by input 55 or otherwise.

The diagnostic navigation program 155 may comprise one or more programs that may be combined together and operate as subroutines, either on a single device or across multiple devices, including comprising various modules or subprograms that interact or operate together. Still further, diagnostic navigation program 155 may be interoperative with application manager 50 and/or connection logic 51 as part of or integrated as the connection manager software or program, including comprising various modules or subprograms that interact or operate together, or may alternatively operate separately from each other.

In a still further configuration of system 10, with reference to FIGS. 3A-3C, 4C, 5B, 6 and 7 an additional credential manager software or program 148 is provided, such as may be or be part of the connection manager software, such as along with the connection logic 51 and/or application manager 50. Credential manager software 148 may be used to supply the access or login credentials of a user, such as mechanic 24, to gain access to diagnostic software programs 53, including to selectively populate the login fields thereto, where the diagnostic software may be original equipment manufacturer (OEM) diagnostic applications as well as third party, aftermarket diagnostic applications. It should be appreciated that each OEM may have one or more diagnostic applications 53, for example, with each make/model of a vehicle of an OEM having a separate diagnostic application and/or a separate login requirement with separate login credentials.

A repair facility can have any number of mechanics or technicians 24 and access to any number of diagnostic software programs 53, each requiring authenticated or licensed access. Such access may be individual to each technician and/or to the repair facility (i.e. an OEM may require each technician or user to have their own login credentials, such that when the technician uses their OEM diagnostic software program, the technician will need to log in). Other examples of credentialing requirements can include security functions, such as locksmiths and other technicians who would need to log into a credentialing service, for example, the National Automotive Service Task Force (NASTF), where credentials are provided that allow a technician and/or locksmith to be credentialed and have the necessary key codes for accessing diagnostic tools for security operations related to the vehicle 22. Regardless of licensing scheme, each technician's access to the diagnostic software programs 53 will require a license and/or associated login credentials. One technician can have access to ten to twenty diagnostic software programs 53 via their corresponding credentials. Tracking all of the credentials for each diagnostic application 53 can be significantly burdensome.

Moreover, for companies with multiple locations and multiple technicians it can be particularly difficult to manage the credential access to diagnostic software programs 53.

The credential manager software 148 facilitates credentialed access to the diagnostic software programs 53 for the users, such as mechanics 24 and remote technician 25, with each user having a separate electronic profile file 149*a*, 149*b*, 149*c* containing login data 153*a*, 153*b*, 153*c* (FIG. 6) maintained in memory and accessible by the credential manager software 148, such as for access to each diagnostic software application 53*a*, 53*b*, 53*c* to which the given user is authorized to use or provided or allowed access. In addition to login data for diagnostic software applications 53, the electronic profile files 149*a*, 149*b*, 149*c* for each user may additionally include credential information for logging into or accessing other original equipment manufacturing software applications, NASTF credentials, as well as secure identification credentials for other third-party vehicle servicing software applications and resources, such as Auto-Auth provided by Integrity Security Services LLC. The profile files 149*a*, 149*b*, 149*c* with associated login data 153*a*, 153*b*, 153*c* may be stored, for example, in memory 28*m* of diagnostic tool 28, memory 37*m* of computer 37 or memory 64*m* of server 64, or the like. Still further, the profile files 149*a*, 149*b*, 149*c* with associated login data 153*a*, 153*b*, 153*c* may be retained in a database, such as database 58.

As discussed herein, a technician enters data into a profile file 149*a*, 149*b*, 149*c* with their credential information for each diagnostic program and its associated license that is then saved to memory, such as memory 28*m* of diagnostic tool 28, memory 37*m* of computer 37 or memory 64*m* of server 64. When system 10 via the connection manager software, such as via connection logic 51 and/or application manager 50, identifies a diagnostic software program 53 requiring credentials, such as fields 67*e*, 67*f* shown on screen 67 of FIG. 7, the credential manager software 148 is used to provide the corresponding credential data information from that technician's profile file 149*a*, 149*b*, 149*c* to populate in the corresponding fields 67*e*, 67*f*. This can include, for example, username, passwords, diagnostic software license information, technician certification number, and the like. In an aspect of the present embodiment, the credential manager 148 either populates the fields 67*e*, 67*f* automatically or opens a dialog box and informs the technician that the login fields may be populated with previously saved login credentials. The respective login fields can also be updated when the technician provides updated login credentials, with the credential manager software 148 updating the corresponding credential information in the profile file 149*a*, 149*b* 149*c* for the given technician. As discussed herein, credential manager software 148 can also be used to manage the technician's access to other aspects of the connection manager software, such as to remote access software 54 used for remotely accessing software programs on other connected devices, including the computer 37 and/or server 64. Furthermore, credential manager 148 is configured to manage user credentials such that the technician 24 can access the particular diagnostic software programs 53*a*, 53*b*, 53*c* included in any of the diagnostic tool 28, the computer 37 and/or the server 64.

In the illustrated embodiment credential manager software 148 is present on the diagnostic tool 28 and/or the computer 37, but may also be on the server 64. The credential manager software 148 may comprise one or more programs that may be combined together and operate as subroutines, either on a single device or across multiple devices, including comprising various modules or subprograms that interact or operate together. Still further, credential manager software 148 may be interoperative with application manager 50 and/or connection logic 51 and/or diagnostic navigation program 155 as part of or integrated as the connection manager software or program, including comprising various modules or subprograms that interact or operate together, or may alternatively operate separately from each other.

The connection manager software, as discussed above such as via the connection logic 51 and/or application manager 50, provides a variety of connection configurations between the diagnostic tool 28, computer 37 and/or server 64, with the credential manager 148 providing credentialed access to the diagnostic software programs, such as programs 53*a*, 53*b* 53*c*.

Figure 4C:
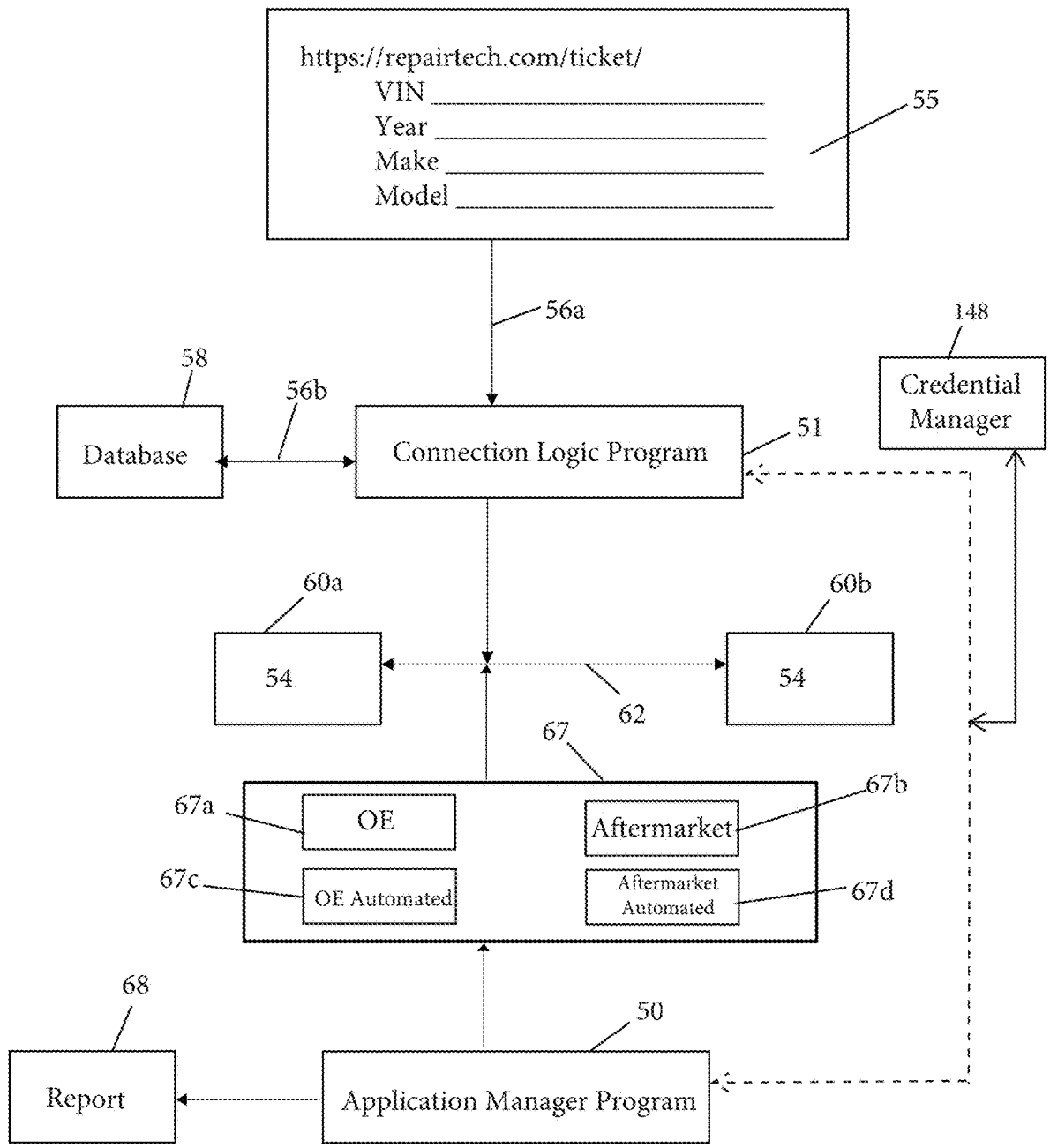
FIG. 4C is a block diagram illustrating the inclusion of a credential manager program for aiding access of diagnostic application programs.

With reference to FIG. 4C, in operation, a mechanic 24 may enter data 55, such as by logging into a diagnostic tool 28 or other computer device, such as computer 37, with the credential manager software 148 configured to be initialized based on the login input data 56 for the mechanic 24. For example, the credential manager 148 may utilize any of the following for login authentication: facial recognition, fingerprint reader, password entry, and/or a two-step authentication process. After the local technician 24, or remote technician 25, has gone through the login process the credential manager software 148 is initialized to provide the credentials for that technician 24 with any of the diagnostic application programs 53*a*, 53*b*, 53*c* for which that technician 24 is authorized to use and has credentials 153*a*, 153*b*, 153*c* stored in memory of or associated with credential manager software 148. Moreover, credential manager software 148 recognizes the given fields 67*e*, 67*f* of a given diagnostic program 53 and may autofill the credential data 153*a*, 153*b* 153*f* associated with that field for the given diagnostic application program 53*a*, 53*b*, 53*c*, or may require a user to confirm or click to enter the credential data. Although noted as providing credential data 153*a*, 153*b* 153*f* associated with a given diagnostic application program 53*a*, 53*b*, 53*c*, it should be appreciated that credential data may be supplied for other vehicle service programs, such as for entering NASTF credentials, or other third-party programs, such as AutoAuth In the illustrated embodiment, the connection logic software 51 and/or application manager software 50, coordinates and configures the connection between the diagnostic tool 28, and/or the portable computer 37, and/or the server 64, while the credential manager software 148 provides credentialed access for the local technician 24 or remote technician 25 to the selected diagnostic software program 53 located on the selected device of the diagnostic tool 28, portable computer 37, and/or server 64. Moreover with respect to the illustrated embodiment, the credential manager software 148 may interact with or be operable by the connection logic software 51 and/or application manager software 50 to automatically provide the credential data 153*a*, 153*b*, 153*c* to the appropriate fields 67*e*, 67*f* at the appropriate timing. It should be appreciated, however, that credential manager software 148 may be used and implemented independently of connection logic software 51 and/or application manager software 50, as well as thus independently of a connection manager software as disclosed herein. For example, a mechanic 24 at a repair facility may have access to numerous diagnostic software programs 53*a*, 53*b*, 53*c* such as may be stored on diagnostic tool 28 and/or a local computer 37, with the mechanic 24 being adept at selecting and running the programs 53 as needed for the particular make, model and year of vehicle 22 being serviced. Such mechanic 24 may thus use credential manager software 148 on the diagnostic tool 28 and/or a local computer 37 for aiding in the initializing of the diagnostic application programs selected for use by the mechanic 24.

As noted above, the credential manager software 148 provides credentialed access to each licensed use of the selected diagnostic software programs 53. Such credentialed access to the diagnostic software program 53 can be handled in the background by the credential manager software 148 and may be initiated, for example, by a user such as mechanic 24 only needing to initially log into the connection manager software, such as logging into the credential manager software 148, or the diagnostic tool 28, with the credential manager software 148 then accessing the user's credential profile file, e.g. 149a, that is stored in the database 58 or device memory 28m to determine what licenses the user has as well as acquiring the login credentials for the diagnostic software program 53, such that when their respective login screen 67 appear, their fields 67e, 67f are automatically populated with the correct login information from the user's profile 149a. It should be appreciated that the profile file 149a, 149b, 149c for the various users of system 10 may include credential information for other software or programs of the system 10, such as the application manager 50, connection logic 51, diagnostic navigation program 155, and remote access software 54, and the like.

While additional input data 56b may be provided to or obtained by the connection logic program 51, application manager 50, and/or credential manager 148 from one or more information storage or databases 58, such as details concerning different types of diagnostic tools 28 at a repair facility, diagnostic software programs 53 stored in the memory 28m of the diagnostic tools 28 and the like, in an aspect of the present embodiment, the databases 58 also include credential information for a given repair facility and/or user, such as a mechanic 24, 25, including login credentials for accessing the remote accessing the diagnostic software 53, as well as for accessing other software of system 10. Thus, after the technician has logged into the credential manager 148, diagnostic tool 28, computer 37 or server 64, the credential manager 148 determines which diagnostic software programs 53 a particular user/technician 24, 25 has licenses for, as well as may determine on which devices 28, 37, 64, and provides the relevant credential information, such as to the application manager software 50 and/or connection logic program 51, to allow the user 24 access to the selected diagnostic software program(s) 53 on the selected computer device 28, 37, 64.

With reference to FIG. 4C, the credential manager software 148 is configured to manage the storage, retrieval, and updating of credential information in the profile files 149a, 149b, 149c. While the credential information can be stored in the databases 58, the credential information may also be stored in the memory of one or more of the devices, for example the memory 28m of the diagnostic tool 28 may include local files that provide a credential profile file 149a, 149b, 149c for each user of that particular diagnostic tool 28. The credential manager 148 may also be local to the diagnostic tool 28. Alternatively, the credential information profile files 149a, 149b, 149c may be located on the memory 37m of the portable computer 37 or in the memory 64m of the server 64. The credential information profile files 149a, 149b, 149c may also be located in more than one of the devices 28, 37, 64, or another computer device. As discussed herein, the technician 24, after signing into the credential manager software 148, diagnostic tool 28, computer 37 or server 64, is able to update their credential profile file 149a, 149b, 149c. Such updates can be performed "on the fly" as the credential manager 148 provides credential information profile files 149a, 149b, 149c for access to a selected diagnostic software program 53 and with the technician correcting or updating the associated login credential information 153a, 153b, 153c, for example a change in password or other login fields. Alternatively, the updates could be performed by a technician 24 updating their credential profile file 149a, 149b, 149c directly by updating credential information found in their respective credential profile file or by adding additional credential information for additional or new logins, such as for new software or different licensed access to existing software.

The credential manager software 148 is also configured to provide support ticket management for particular users and their diagnostic program usage. Such management can include linking particular support tickets with any associated licensed diagnostic program access in connection with the support ticket. In the process of servicing a vehicle 22 connected to a support ticket, one or more technicians 24, 25 may have logged in and used one or more diagnostic software programs 53. Such management can also link remote access software use as well. Such management can assist in ensuring that each licensed use of a diagnostic program and/or remote access software will be properly accounted for and linked to the correct support ticket.

Accordingly, the coordination and handling of user credentials regardless of the remote access software and/or diagnostic software programs used, may be performed by the credential manager software 148. The configured connection thus does not allow or require the user, such as the mechanic 24 in the repair facility or a technician 25 at the remote repair facility, to select from available devices, and instead launches a single connection to the correct devices, such as to the correct one of a plurality of available diagnostic tools 28 or the correct one of a plurality of possible cloud servers 64, and including connecting with the predetermined appropriate diagnostic software program 53. It should be appreciated that although the connection manager software, such as through the connection logic 51 and/or application manager 50, configures the connection between the diagnostic tool 28 and the computer 37 and/or server 64, that involvement by the mechanic 24 or technician 25 may still be required for finalizing the user login, for finalizing the connection, and/or for initiating the vehicle service using the diagnostic tool 28 and determined diagnostic software program 53.

Figure 5C:
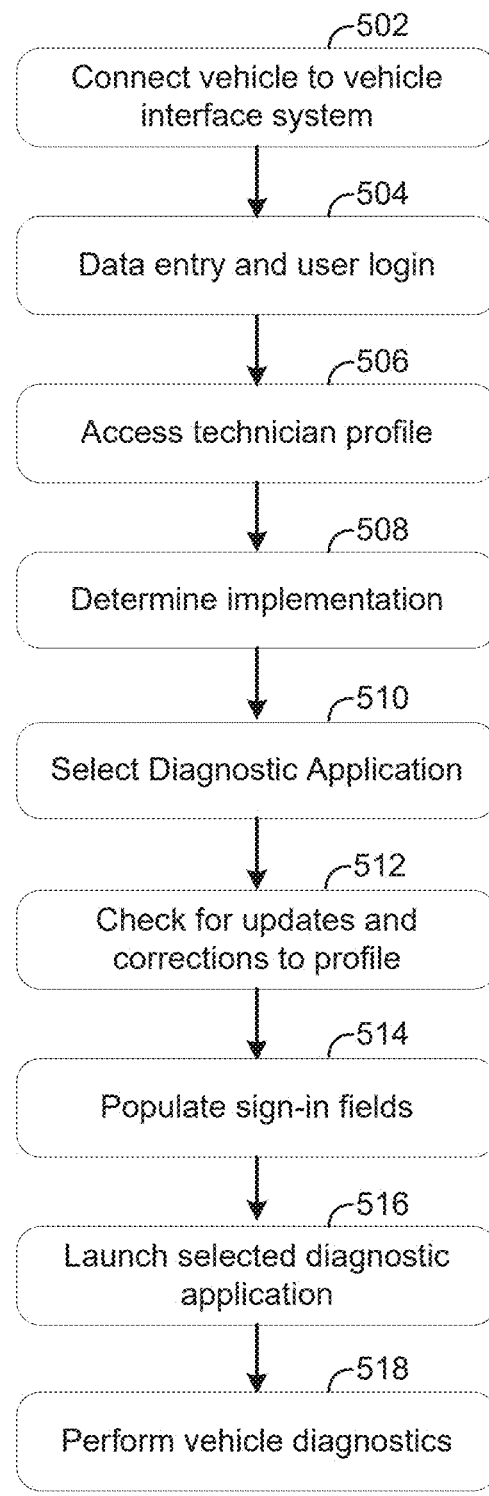
FIG. 5C is a flow diagram illustrating steps to a method for establishing automated credentialed connectivity to a particular diagnostic application program.
Figure 6:
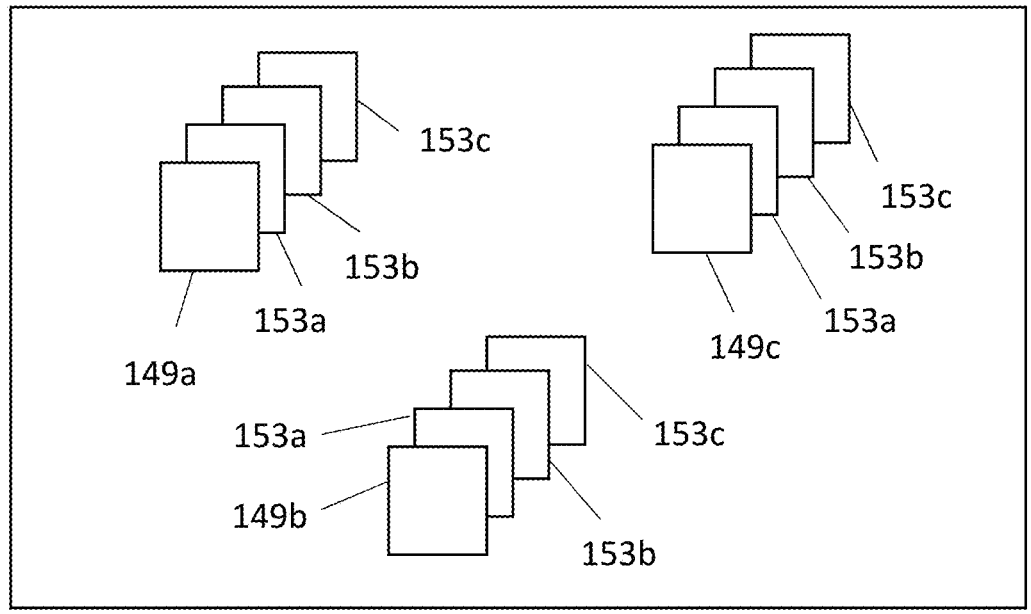
FIG. 6 illustrates user profiles and credential files for multiple users and multiple diagnostic application programs.
Figure 7:
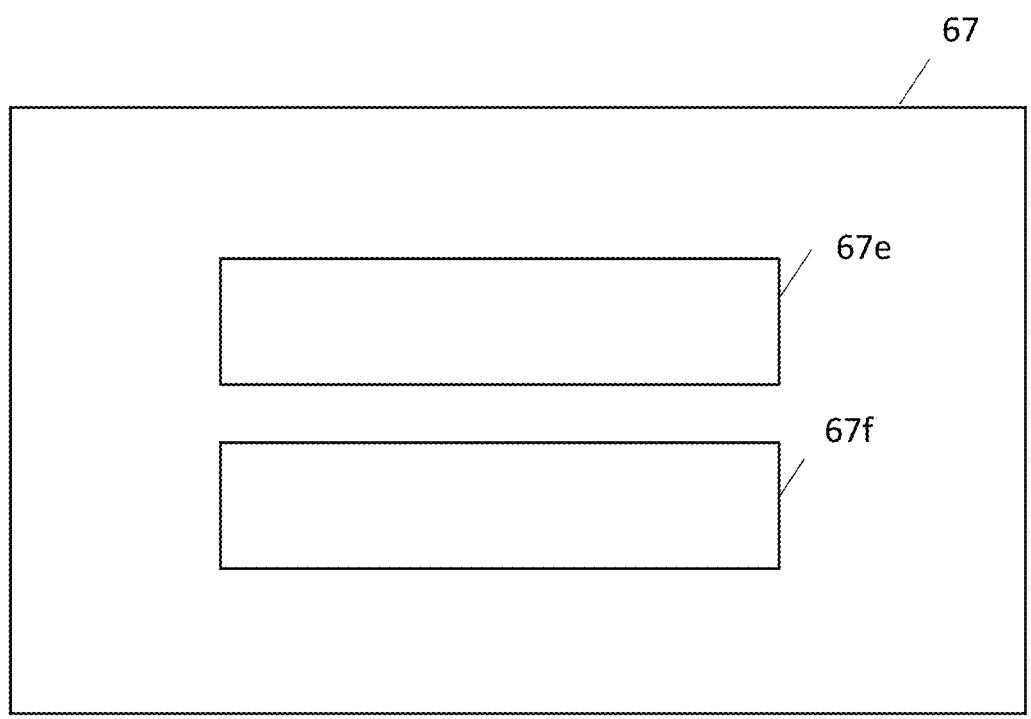
FIG. 7 illustrates a display screen of a computing device of the system with fields for population of credentials by the application manager program.

FIG. 5C is a flow diagram illustrating steps of a vehicle diagnostic system and method for automated credentialed connectivity to a diagnostic software program 53. As noted at step 502, a diagnostic tool 28 may be connected to the vehicle 22, such as via the OBD connector 32. At step 504, data entry 55 is made such as to an electronic ticket whereby data inputs 56 are supplied to the connection logic 51. It should be appreciated that such data entry can begin by a technician 24 (or remote technician 25) logging into the credential manager software 148 such that in step 506 of FIG. 5C, the technician's credential profile 149a, 149b or 149c is accessed by the credential manager 148. It should also be appreciated, that data entry 55 may be made, such as via a web browser on another computer device, prior to selecting a given diagnostic tool 28 and connecting the tool 28 to the vehicle 22. For example, the connection logic 51 may direct the mechanic 24 regarding which diagnostic tool 28 to use from a plurality of potential diagnostic tools available to the technician 24 at the repair facility, for example, based upon available diagnostic tools that are available and which ones of those diagnostic tools the technician 24 is authorized or licensed to use. Upon receiving the input data 56, at step 508 of FIG. 5C, the connection logic 51, as defined by the license availability provided by the credential manager 148, determines the appropriate connection configuration to make between the diagnostic tool 28 and the computer 37 and/or server 64. In addition, at step 510 of FIG. 5C, the connection logic 51 configures and launches the respective remote access software 54 for making the connection between the determined diagnostic tool 28 and the computer 37 and/or server 64. In step 512 of FIG. 5C, as part of the "sign-in" procedures for the selected remote access software 54 and the selected diagnostic programs 53, the credential manager 148 may check for credential information "updates" and corrections to a user's credential profile files 149a, 149b or 149c. Such updates and corrections can be provided directly by the technician 24 via the credential manager 148. In step 514 of FIG. 5C one or more fields 67e, 67f, such as user name and password, are populated by the credential manager 148 without requiring input from the technician 24. However, the technician can choose to input different credential information. In step 516 of FIG. 5C, upon making the determined connection the selected diagnostic application 53 is launched. In step 518 of FIG. 5C, the vehicle service associated with a service ticket can be performed using the diagnostic tool 28 and the determined diagnostic software program 53. As noted, such selection and access may be based upon the available diagnostic software programs 53 and the licenses available to individuals 24, 25 using the system 10.

Vehicle diagnostic system 10 may be configured to be selectively operable in one of a plurality of different modes, whereby a technician may use the diagnostic tool 28 for vehicle maintenance, scanning, diagnosis, programming, and/or repair as needed, including depending on the configuration of diagnostic tool 28, which may be configured for limited purposes, such as for obtaining diagnostic data from the electronic system 23 of vehicle 22, or may be additionally configured with the capability for programming the electronic system 23 of vehicle 22. As noted, system 10 uses the determined diagnostic software 53 for servicing vehicle 22, such as for scanning, diagnosing and/or programing the electronic system 23 of vehicle 22. An exemplary aftermarket diagnostic application software program 53 comprises a program provided by an automotive manufacturer or a company that supplies diagnostic software programs, such as Opus IVS, Inc., with the diagnostic tool configured to enable the reading and reporting of fault codes in the electronic system of the vehicle such as may be located in ECUs of the vehicle. In practice, the memories 28m, 37m, 64m may include multiple diagnostic application programs comprising OE diagnostic software programs and/or aftermarket diagnostic software programs, each for use with various makes and/or models of vehicles to enable diagnosing and programming of ECUs via diagnostic tool 28, including depending on the particular vehicle and vehicle systems/ECUs on the vehicle installed by the OEM based on the customer's selection of vehicle options. Alternatively, and/or additionally, multiple remote servers 64 may be accessible via system 10 with certain remote servers 64 only having OE diagnostic application software 53 and others having third-party aftermarket diagnostic application software 53, and/or servers 64 having both OE and aftermarket diagnostic application software 53.

In the illustrated embodiment, vehicle diagnostic tool 28 includes one or more commercially available diagnostic scanning programs 53a, 53b, 53c that are configured for use with a specific vehicle 22. Although shown as having three diagnostic scanning programs 53a, 53b, 53c it should be appreciated that memory 28m can include fewer than three such programs, or may include additional such programs available for use with various vehicles 22 of different makes and models. Thus, numerous such diagnostic scanning programs 53 can be stored in memory 28m. The diagnostic scanning application programs may include OEM diagnostic scanning programs 53 and third-party diagnostic scanning programs 53, and it should be appreciated that multiple such programs may be included for use with multiple different makes and models of vehicles. The diagnostic scanning programs 53 may be used to retrieve diagnostic trouble codes from ECUs in the vehicle's electronic system 23. That is, the diagnostic scanning programs 53 may be used to diagnose maintenance issues (e.g., a faulty catalytic converter, oxygen sensors failing to switch as expected, lean condition in the engine, which are DTCs indicative of failures in the vehicle components) and/or may be used for programming electronic system 23. Alternatively, the diagnostic tool 28 may not include its own diagnostic programs 23.

Although the system 10 of FIG. 1 is illustrated as having availability of both a laptop 37 and a server 64, it should be appreciated that in some configurations there may not be availability of both such devices. In which case, connection logic 51 may include this as factor in determining what connection to launch. Moreover, as noted above, although computer 37 is discussed above as a portable laptop computer it should be appreciated that computer 37 may be configured as anyone of a number of other alternative computer devices, including a computer device that is not a laptop or not portable.

It should further be appreciated that diagnostic tool 28 may be constructed in various manners. With reference to FIGS. 1 and 2, the vehicle diagnostic tool 28 in the illustrated embodiment includes a housing 28a and a screen 66a, with the housing 28a containing circuitry, hardware, and software, such as a vehicle interface module 27 coupled with a computer module 30.

In use, tool 28 is connected with vehicle 22 by operator 24, such as by connecting to an on-board diagnostic ("OBD") diagnostic port 32 of the vehicle 22 in order to service the electronic system 23 of vehicle 22, including various vehicle electronic control units (ECUs), such as an engine ECU 34, body ECU 36, brakes ECU 38, and/or other ECUs 40, including ADAS ECUs 41, and including other electronic parts and components of vehicle 22. Tool 28 connects with port 32, such as via vehicle cable 43. Vehicle interface 27 includes a controller 29, such as in the form of a processor or micro-processor and interface circuitry to facilitate communication between the ECUs and the vehicle interface 27. The vehicle interface 27 includes a database of vehicle protocols found in a local memory 44 that allows communication with the ECUs of various makes and models of vehicles. Interface module 27 may be configured as an SAE standard J2534 device, such as a device compliant with the J2534-2 standard, or as an ISO compliant or other standard compliant device for supporting and enabling communication with the electronic systems of a vehicle. Vehicle diagnostic tool 28 additionally includes interfaces 46, 74 for communication between interface module 27 and computer module 30, where computer module 30 additionally includes a controller and memory. As understood from FIG. 2, vehicle diagnostic tool 28 may be connected to a remote computer, such as a remote computer 37 and/or a server 64, such as by an Internet 70 connection with interface 52. Note, that any connections between the diagnostic tool 28 and computer devices 37 and/or 64 can be controlled by the remote access software 54, and their credentialed access to the remote access software 54 and any selected diagnostic software programs 53 may be coordinated and controlled by the credential manager software 148. Additionally and/or alternatively diagnostic tool 28 may be connected with a computer 37 when such a computer is local to the repair facility via connection with another interface, such as by a cable or wireless connection. Diagnostic tool 28 may be used with local computer 37 when, for example, diagnostic tool 28 is not constructed to include an internal computer module 30. In the illustrated embodiment, diagnostic tool 28 includes an input/output (I/O) interface 66 for coupling to peripheral devices, such as one or more of a monitor, keyboard, mouse, and the like. In a further illustrated embodiment, the diagnostic tool 28 is implemented as a laptop computer with integrated monitor, keyboard, and mouse. Vehicle interface module 27 and computer module 30 are thus cooperatively used for querying/scanning and diagnosing ECUs of vehicle 22, including for accessing error codes generated by the ECUs for assessing and diagnosing operational and performance related aspects of the vehicle 22. System 10, in addition to performing scanning operations, may also be used for reprogramming of vehicle 22, such as reprogramming selected ECUs, including reprogramming ECUs based on a determination of fault codes. Although vehicle interface diagnostic tool 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

Diagnostic tool 28 in the illustrated embodiment is disclosed as an integrated device with vehicle interface 27 and computer module 30 being contained within housing 28. Alternatively, however, vehicle interface 27 and computer 30 may be separate devices, with computer 30 configured as computing device 37, such as a laptop, tablet or other computing device. Still further, an alternative diagnostic tool 28 may not be configured to directly store and run diagnostic application programs 53. Instead, such an alternative diagnostic tool 28 may operate in connection with a local computer, such as a local laptop computer 37 for running diagnostic software programs 53. In such a configuration the diagnostic tool 28 may operate as a pass-through device for exchanging the vehicle data between the electronic system 23 of the vehicle 22 and the computer 37. In other exemplary embodiments, the credential manager software 148 in a stand-alone configuration is present in the memory 28*m* of a diagnostic tool 28 or memory 37*m* of computer 37 and is capable of managing the logins of various diagnostic software applications 53 locally accessed by the diagnostic tool 28. That is, the credential manager software 148 can be configured to manage access to diagnostic software programs 53 using diagnostic tool 28 or computer 37 as a stand-alone device that is not connected to either another computer device 37 or a server 64. Alternatively, while functioning as a stand-alone utility, the credential manager software 148 on the diagnostic tool 28 or computer 37 may also provide the credentials for access to diagnostic programs 53 located in remote databases or computer devices.

In the illustrated embodiment the control logic 51 is disclosed as being resident on various of the devices, including the computer 37 and server 64. It should be appreciated that alternative arrangements may be employed within the scope of the present invention. For example, one or more of the various programs may reside on different devices. Still further, the control logic 51 may comprise one or more programs that may be combined together and operate as subroutines, either on a single device or across multiple devices.

Changes and modifications in the specifically described embodiments can be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A method of facilitating access to one or more vehicle service programs for servicing an electronic system of a vehicle with a vehicle diagnostic computer tool at a repair facility, wherein the vehicle diagnostic computer tool is configured to interface with the electronic system of a vehicle for operation of a vehicle service program for servicing the vehicle, said method comprising:
   storing in computer memory a profile file for each of one or more users, wherein each profile file comprises credential data for a selected user for accessing one or more vehicle service programs;
   providing credential manager software configured to access user profile files to obtain credential data;
   using the credential manager software to selectively obtain credential data of a selected user for a selected vehicle service program; and
   supplying the credential data for the selected user with the credential manager software to the selected vehicle service program to access the selected vehicle service program for servicing the vehicle.

2. The method of claim 1, wherein said storing in computer memory a profile file for each of one or more users comprises storing credential data for a plurality of diagnostic software applications.

3. The method of claim 2, wherein the plurality of diagnostic software applications comprise original equipment manufacturer (OEM) diagnostic software applications.

4. The method of claim 3, wherein at least a portion of the OEM diagnostic software applications are stored on a plurality of remote computer devices that are remote from the repair facility.

5. The method of claim 2, wherein said storing in computer memory a profile file for each of one or more users comprises storing in computer memory a profile file for each of a plurality of users.

6. The method of claim 1, wherein said storing in computer memory comprises storing in computer memory of the diagnostic computer tool.

7. The method of claim 1, further comprising receiving login data from a user and wherein said using the credential manager software to selectively obtain credential data comprises using the credential manager software to selectively obtain credential data of a selected user based on the login data.

8. The method of claim 1, wherein said supplying the credential data with the credential manager software to the vehicle service program comprises supplying the credential data via one or more fields displayed on a screen of a computer device.

9. The method of claim 8, wherein the one or more fields displayed on a computer screen comprise one or more fields displayed on a screen of the diagnostic computer tool.

10. The method of claim 8, wherein said supplying the credential data with the credential manager software to the vehicle service program via one or more fields displayed on a screen of a computer device comprises automatically populating the one or more fields with the credential data.

11. The method of claim 1, wherein the credential data comprises a user name and password for each of a plurality of vehicle service programs.

12. The method of claim 1, wherein the profile files are retained in memory with the credential manager software.

13. A method of facilitating access to a plurality of original equipment manufacturer (OEM) diagnostic software applications for servicing electronic systems of vehicles with a vehicle diagnostic computer tool at a repair facility, wherein the vehicle diagnostic computer tool is configured to interface with the electronic systems of the vehicles for operation of a selected diagnostic software application for servicing the vehicle, said method comprising:
   storing in computer memory a profile file for each of one or more users, wherein each profile file comprises credential data for a selected user for accessing the plurality of diagnostic software applications;
   providing credential manager software configured to access user profile files to obtain credential data;
   using the credential manager software to selectively obtain credential data of a selected user to a selected diagnostic software application for accessing the selected diagnostic software application to service the vehicle; and
   supplying the credential data for the selected user with the credential manager software to the selected diagnostic software application via one or more fields displayed on a screen of a computer device.

14. The method of claim 13, wherein at least a portion of the diagnostic software applications are stored on a plurality of remote computer devices that are remote from the repair facility.

15. The method of claim 13, wherein said storing in computer memory a profile file for each of one or more users comprises storing in computer memory a profile file for each of a plurality of users.

16. The method of claim 13, further comprising receiving login data from a user and wherein said using the credential manager software to selectively obtain credential data comprises using the credential manager software to selectively obtain credential data of a selected user based on the login data.

17. A vehicle diagnostic system for controlling access to diagnostic software programs to service an electronic system of a vehicle at a repair facility, the system comprising:
   a vehicle diagnostic computer tool configured to access a plurality of diagnostic software programs based on credential data supplied to the diagnostic software programs, wherein the vehicle diagnostic computer tool is configured to interface with an electronic system of a vehicle for operation of a selected diagnostic software program for servicing the vehicle;
   a profile file stored in memory for each of one or more users, wherein each profile file comprises credential data for a selected user for accessing one or more vehicle service programs;
   credential manager software, wherein the credential manager software is configured to access user profile files to obtain credential data;
   wherein the credential manager software is configured to selectively obtain credential data of a selected user to a selected diagnostic software application for accessing the selected diagnostic software application to service the vehicle, and wherein the credential manager software is configured to selectively supply the credential data for the selected user to the selected diagnostic software application.

18. The system of claim 17, wherein the credential manager software is configured to supply the credential data to the selected diagnostic software application via one or more fields displayed on a screen of a computer device.

19. The system of claim 17, wherein at least a portion of the diagnostic software applications are stored on a plurality of remote computer devices that are remote from the repair facility.

20. The method of claim 17, wherein said credential manager software is configured to receive login data from a user, and wherein said credential manager software is configured to selectively obtain credential data based on the login data.

* * * * *